United States Patent
Ngai et al.

(10) Patent No.: US 8,781,437 B2
(45) Date of Patent: Jul. 15, 2014

(54) SYSTEMS AND METHODS FOR DYNAMIC TRANSMISSION POWER LIMIT BACK-OFF FOR SPECIFIC ABSORPTION RATE COMPLIANCE

(75) Inventors: Francis Ming-Meng Ngai, Boulder, CO (US); John A. Forrester, San Diego, CA (US); Anshul Pandey, San Diego, CA (US); Supratik Bhattacharjee, San Diego, CA (US); Rema Vaidyanathan, San Diego, CA (US); Brian Michael George, San Diego, CA (US); Zhu Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/411,392

(22) Filed: Mar. 2, 2012

(65) Prior Publication Data
US 2012/0270519 A1 Oct. 25, 2012

Related U.S. Application Data

(60) Provisional application No. 61/449,512, filed on Mar. 4, 2011, provisional application No. 61/480,191, filed on Apr. 28, 2011.

(51) Int. Cl.
*H04M 11/00* (2006.01)
(52) U.S. Cl.
USPC ........ 455/404.1; 455/553; 455/522; 455/557; 455/550.1; 455/556.1; 455/572; 455/575.1; 455/115.1; 455/574
(58) Field of Classification Search
USPC ........... 455/553, 522, 557, 550.1, 556.1, 572, 455/575, 115, 404.1, 574, 575.1, 115.1
See application file for complete search history.

(56) References Cited

U.S. PATENT DOCUMENTS

| | | | |
|---|---|---|---|
| 5,930,684 A | 7/1999 | Keskitalo et al. | |
| 6,195,562 B1 * | 2/2001 | Pirhonen et al. | 455/553.1 |
| 7,146,139 B2 | 12/2006 | Nevermann | |
| 8,023,984 B2 | 9/2011 | Jin et al. | |
| 2003/0064761 A1 * | 4/2003 | Nevermann | 455/572 |
| 2005/0124305 A1 | 6/2005 | Stichelbout | |
| 2007/0111681 A1 | 5/2007 | Alberth, Jr. et al. | |
| 2009/0253459 A1 | 10/2009 | Naganuma et al. | |
| 2009/0305742 A1 | 12/2009 | Caballero et al. | |

(Continued)

FOREIGN PATENT DOCUMENTS

WO WO2006/040663 A1 4/2006

OTHER PUBLICATIONS

International Search Report and Written Opinion—PCT/US2012/027753—ISA/EPO—Apr. 26, 2012.

*Primary Examiner* — Khalid Shaheed
(74) *Attorney, Agent, or Firm* — Charles E. Eggers

(57) ABSTRACT

This disclosure provides systems, methods and apparatus for providing transmission power limit back-off for Specific Absorption Rate (SAR) compliance. In one aspect, a method implemented in a wireless communication apparatus is provided. The method includes receiving an indication of at least one operating mode indicative of a proximity and an orientation of at least one transmitting antenna of the wireless communication apparatus. The method further includes determining a power transmission characteristic based on the determined operating mode and at least one of a radio access technology type, a band-class, a transmission configuration, an uplink channel, a traffic state, and a radio access technology transmission state used by the wireless communication apparatus, or any combination thereof.

40 Claims, 22 Drawing Sheets

(56) References Cited

U.S. PATENT DOCUMENTS

| | | | |
|---|---|---|---|
| 2009/0325517 A1* | 12/2009 | Fan | 455/127.2 |
| 2010/0056210 A1* | 3/2010 | Bychkov et al. | 455/556.1 |
| 2010/0137945 A1* | 6/2010 | Gadagkar et al. | 607/60 |
| 2010/0267415 A1 | 10/2010 | Kakitsu et al. | |
| 2010/0291963 A1 | 11/2010 | Patel et al. | |
| 2011/0263216 A1 | 10/2011 | Lee et al. | |
| 2012/0021800 A1 | 1/2012 | Wilson et al. | |
| 2012/0270592 A1* | 10/2012 | Ngai et al. | 455/522 |

* cited by examiner

700a

| Device State Index | Tx Power Limit (dBm) |
|---|---|
| DSI = 0 | 24.0 |
| DSI = 1 | 23.0 |
| DSI = 2 | 22.0 |
| DSI = 3 | 21.0 |
| DSI = 4 | 20.0 |
| DSI = 5 | 19.0 |
| DSI = 6 | 18.0 |
| DSI = 7 | 17.0 |
| DSI = 8 | 16.0 |

| Device State Index | Tx Power Limit (dBm) |
|---|---|
| DSI = 0 | 23.0 |
| DSI = 1 | 22.5 |
| DSI = 2 | 21.5 |
| DSI = 3 | 20.5 |
| DSI = 4 | 19.5 |
| DSI = 5 | 18.5 |
| DSI = 6 | 17.5 |
| DSI = 7 | 16.5 |
| DSI = 8 | 15.5 |

FIG. 7B

| Row | Communication Parameters/characteristics | | | | | | | Tx Power Limit (dBm) | | | | | | | | |
|---|---|---|---|---|---|---|---|---|---|---|---|---|---|---|---|---|
| | Radio Access Technology | Band Class | Configuration | State of RAT | UL Channel | Call Type | Device Mode | DSI = 0 | DSI = 1 | DSI = 2 | DSI = 3 | DSI = 4 | DSI = 5 | DSI = 6 | DSI = 7 | DSI = 8 |
| 1 | RAT 1 | 0 | NA | System Access | Channel A | Normal | Normal | | 24.0 | | | | | | | |
| 2 | RAT 1 | 0 | NA | Traffic | Channel B | Normal | Normal | 24.0 | 23.0 | 22.0 | 21.0 | 20.0 | 19.0 | 18.0 | 17.0 | 16.0 |
| 3 | RAT 1 | 0 | NA | Traffic | Channel B | E911 | E911 | | 24.0 | | | | | | | |
| 4 | RAT 1 | 0 | NA | Traffic | Channel B | Normal | E911 CB | | 24.0 | | | | | | | |
| 5 | RAT 1 | 1 | NA | System Access | Channel A | Normal | Normal | | | | | | | | | |
| 6 | RAT 1 | 1 | NA | Traffic | Channel B | Normal | Normal | 24 | 22 | 21 | 20 | 19 | 18 | 17 | 16 | 15 |
| 7 | RAT 1 | 1 | NA | Traffic | Channel B | E911 | E911 | | | | | | | | | |
| 8 | RAT 1 | 1 | NA | Traffic | Channel B | Normal | E911 CB | | | | | | | | | |
| 9 | ... | ... | ... | ... | ... | ... | ... | | | | | | | | | |
| 10 | RAT 2 | Z | NA | System Access | Channel C | Normal | Normal | | | | | | | | | |
| 11 | RAT 2 | Z | Modulation Type X | Traffic | Channel D | Normal | Normal | 23.0 | 22.5 | 21.5 | 20.5 | 19.5 | 18.5 | 17.5 | 16.5 | 15.5 |
| 12 | RAT 2 | Z | Modulation Type Y | Traffic | Channel D | Normal | Normal | | | | 18.5 | | | | | |
| 13 | RAT 2 | Z | Modulation Type Y | Traffic | Channel E | Normal | Normal | | | 23.0 | | | | | | |

FIG. 8

| First Transmitter Tx Power | Second Transmitter Tx Power Limit |
|---|---|
| Tx Power Level 1 | 32 |
| Tx Power Level 2 | 34 |
| Tx Power Level 3 | 36 |
| Tx Power Level 4 | 38 |
| Tx Power Level 5 | 40 |

| First Transmitter Tx Power | Second Transmitter Tx Power Limit |
|---|---|
| Tx Power Level < Level 1 | 30 |
| Level 1 <= Tx Power Level < Level 2 | 32 |
| Level 2 <= Tx Power Level < Level 3 | 34 |
| Level 3 <= Tx Power Level < Level 4 | 36 |
| Level 4 <= Tx Power Level < Level 5 | 38 |
| Level 5 <= Tx Power Level | 40 |

| First Transmitter Tx Power | Second Transmitter Tx Power Limit |
|---|---|
| Tx Power Level 1 + Bias_input(DSI) | 32 + Bias_output(DSI) |
| Tx Power Level 2 + Bias_input(DSI) | 34 + Bias_output(DSI) |
| Tx Power Level 3 + Bias_input(DSI) | 36 + Bias_output(DSI) |
| Tx Power Level 4 + Bias_input(DSI) | 38 + Bias_output(DSI) |
| Tx Power Level 5 + Bias_input(DSI) | 40 + Bias_output(DSI) |

| DSI | Input Bias | Output Bias |
|---|---|---|
| 0 | 0 | 0 |
| 1 | Bias_input(1) | Bias_output(1) |
| 2 | Bias_input(2) | Bias_output(2) |
| 3 | Bias_input(3) | Bias_output(3) |
| 4 | Bias_input(4) | Bias_output(4) |
| 5 | Bias_input(5) | Bias_output(5) |
| 6 | Bias_input(6) | Bias_output(6) |
| 7 | Bias_input(7) | Bias_output(7) |
| 8 | Bias_input(8) | Bias_output(8) |

SYSTEMS AND METHODS FOR DYNAMIC TRANSMISSION POWER LIMIT BACK-OFF FOR SPECIFIC ABSORPTION RATE COMPLIANCE

CROSS REFERENCE TO RELATED APPLICATIONS

This application claims benefit under 35 U.S.C. §119(e) to U.S. Provisional Patent Application No. 61/449,512 entitled "DYNAMIC TRANSMISSION POWER LIMIT BACK-OFF FOR SPECIFIC ABSORPTION RATE COMPLIANCE" filed on Mar. 4, 2011, the disclosure of which is hereby incorporated by reference in its entirety. This application additionally claims benefit under 35 U.S.C. §119(e) to U.S. Provisional Patent Application No. 61/480,191 entitled "DYNAMIC TRANSMISSION POWER LIMIT BACK-OFF FOR SPECIFIC ABSORPTION RATE COMPLIANCE" filed on Apr. 28, 2011, the disclosure of which is hereby incorporated by reference in its entirety.

BACKGROUND

1. Field

The present application relates generally to communications, and more specifically to transmission power levels in a wireless communication apparatus.

2. Background

Wireless communication systems are widely deployed to provide various types of communication content such as voice and data. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Mobile devices may further simultaneously support communication using multiple radio access technologies. Different radio access technologies may be used to expand the scope of services offered by the communication such as by expanding the geographic region in which the device may operate, as a mobile device moves through different regions supporting different radio access technologies. Furthermore, different radio access technologies may be used to simultaneously allow a user to engage in a variety of different forms of wireless communication activities. A need exists for managing transmission characteristics based on operating modes for different radio access technologies.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides an implementation of a method implemented in a wireless communication apparatus. The method includes receiving an indication of at least one operating mode indicative of a proximity and an orientation of at least one transmitting antenna of the wireless communication apparatus with respect to a user of the wireless communication apparatus. The method further includes determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof.

Another aspect of the subject matter described in the disclosure provides a wireless communication apparatus. The apparatus includes at least one transmitting antenna. The apparatus further includes a processor. The processor is configured to receive an indication of at least one operating mode indicative of a proximity and an orientation of a transmitting antenna with respect to a user of the wireless communication apparatus. The processor is further configured to determine a power transmission characteristic based on the at least one operating mode and at least one of a radio access technology type, a band-class, a transmission configuration, an uplink channel, a traffic state, and a radio access technology transmission state used by the wireless communication apparatus, or any combination thereof.

Yet another aspect of the subject matter described in the disclosure provides a wireless communication apparatus. The apparatus further includes means for receiving an indication of at least one operating mode indicative of a proximity and an orientation of at least one transmitting antenna of the wireless communication apparatus with respect to a user of the wireless communication apparatus. The apparatus further includes means for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof.

Another aspect of the subject matter described in the disclosure provides a computer program product. The computer program product includes a computer-readable medium. The computer-readable medium includes code for receiving an indication of at least one operating mode indicative of a proximity and an orientation of at least one transmitting antenna of a wireless communication apparatus with respect to a user of the wireless communication apparatus. The computer-readable medium further includes code for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof.

Another aspect of the subject matter described in the disclosure provides an implementation of a method implemented in a wireless communication apparatus. The method includes receiving an indication of at least one operating mode indicative of a proximity and an orientation of at least one transmitting antenna of the wireless communication apparatus with respect to a user of the wireless communication apparatus. The method further includes selecting from a plurality of transformations associated with the at least one operating mode. The method further includes applying a selected transformation to adjust a relationship between a power transmission level of a first transmitter and a power transmission level of a second transmitter. The method further includes determining a target power transmission level of the first transmitter based on the adjusted relationship and a current power transmission level of the second transmitter.

Another aspect of the subject matter described in the disclosure provides a wireless communication apparatus. The apparatus include at least one transmitting antenna. The apparatus further includes a first transmitter. The apparatus further includes a second transmitter. The apparatus further includes a processor. The processor is configured to receive an indication of at least one operating mode indicative of a proximity and an orientation of the at least one transmitting antenna with respect to a user of the wireless communication apparatus. The processor is further configured to select from a plurality of transformations associated with the at least one operating mode. The processor is further configured to apply a selected transformation to adjust a relationship between a power transmission level of the first transmitter and a power transmission level of the second transmitter. The processor is further configured to determine a target power transmission level of the first transmitter based on the adjusted relationship and a current power transmission level of the second transmitter.

Yet another aspect of the subject matter described in the disclosure provides a wireless communication apparatus. The apparatus includes means for receiving an indication of at least one operating mode indicative of a proximity and an orientation of at least one transmitting antenna of the wireless communication apparatus with respect to a user of the wireless communication apparatus. The apparatus further includes means for selecting from a plurality of transformations associated with the at least one operating mode. The apparatus further includes means for applying a selected transformation to adjust a relationship between a power transmission level of a first transmitter and a power transmission level of a second transmitter. The apparatus further includes means for determining a target power transmission level of the first transmitter based on the adjusted relationship and a current power transmission level of the second transmitter.

Another aspect of the subject matter described in the disclosure provides a computer program product. The computer program product includes a computer-readable medium. The computer-readable medium includes code for receiving an indication of at least one operating mode indicative of a proximity and an orientation of at least one transmitting antenna of a wireless communication apparatus with respect to a user of the wireless communication apparatus. The computer-readable medium further includes code for selecting from a plurality of transformations associated with the at least one operating mode. The computer-readable medium further includes code for applying a selected transformation to adjust a relationship between a power transmission level of a first transmitter and a power transmission level of a second transmitter. The computer-readable medium further includes code for determining a target power transmission level of the first transmitter based on the adjusted relationship and a current power transmission level of the second transmitter.

BRIEF DESCRIPTION OF THE DRAWINGS

FIGS. 7A-7B show examples of two exemplary look up tables which may be used to determine a transmission power limit according to a device state index.

FIG. 8 provides an example of a portion of a table for determining transmission power limits for a given radio access technology type, a band-class, a configuration, a transmission state, a uplink channel, a call type and a device mode.

FIG. 14A shows an example of a look up table that may be used to determine a power transmission limit for a second transmitter based on the current power transmission level of a first transmitter.

FIG. 14B shows a table that illustrates how the look up table of FIG. 14A may be used to determine the transmission power limit for a second transmitter based on the current transmission power level of a first transmitter.

FIG. 17A shows an example of a look up table defining a standard set of transmission power limits for data on a second transmitter according to transmission power limits for data on a first transmitter with the ability to adjust the standard values according to a transformation.

FIG. 17B shows an example of a lookup table that may be used to determine the amount of bias to be applied for each device state index to the look up table of FIG. 17A.

Figure 1:
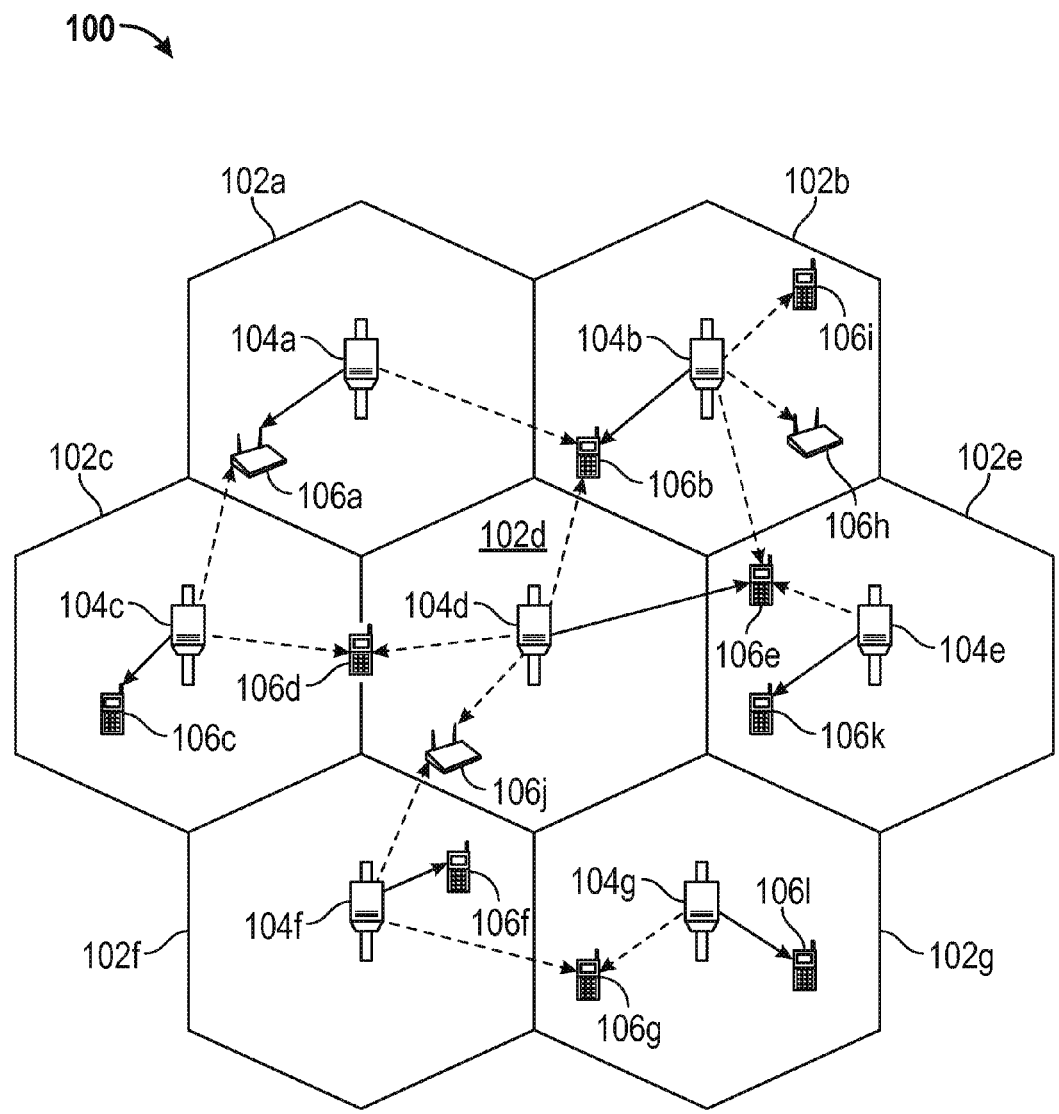
FIG. 1 shows an example of a simplified diagram of a wireless communication system.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of implementations within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The word "exemplary" is used herein to mean "serving as an example, instance, or illustration." Any implementation described herein as "exemplary" is not necessarily to be construed as preferred or advantageous over other implementations. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the implementations shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 and EV-DO are described in documents from an organization named "3rd Generation Partnership Project 2" (3GPP2). These various radio technologies and standards are known in the art.

The techniques described herein may further be used with various modes associated with different radio access technologies such as simultaneous voice and data modes that allow simultaneously sending and receiving voice and non-voice data. For example, Simultaneous 1X Voice and EV-DO Data (SVDO) and Simultaneous 1X and LTE (SVLTE) modes may be used.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l. For ease of reference, ATs 106a-106l may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one implementation, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106*a*, 106*h*, and 106*j* comprise routers. ATs 106*b*-106*g*, 106*i*, 106*k*, 106*l* comprise mobile phones. However, each of ATs 106*a*-106*l* may comprise any suitable communication device.

Figure 2:
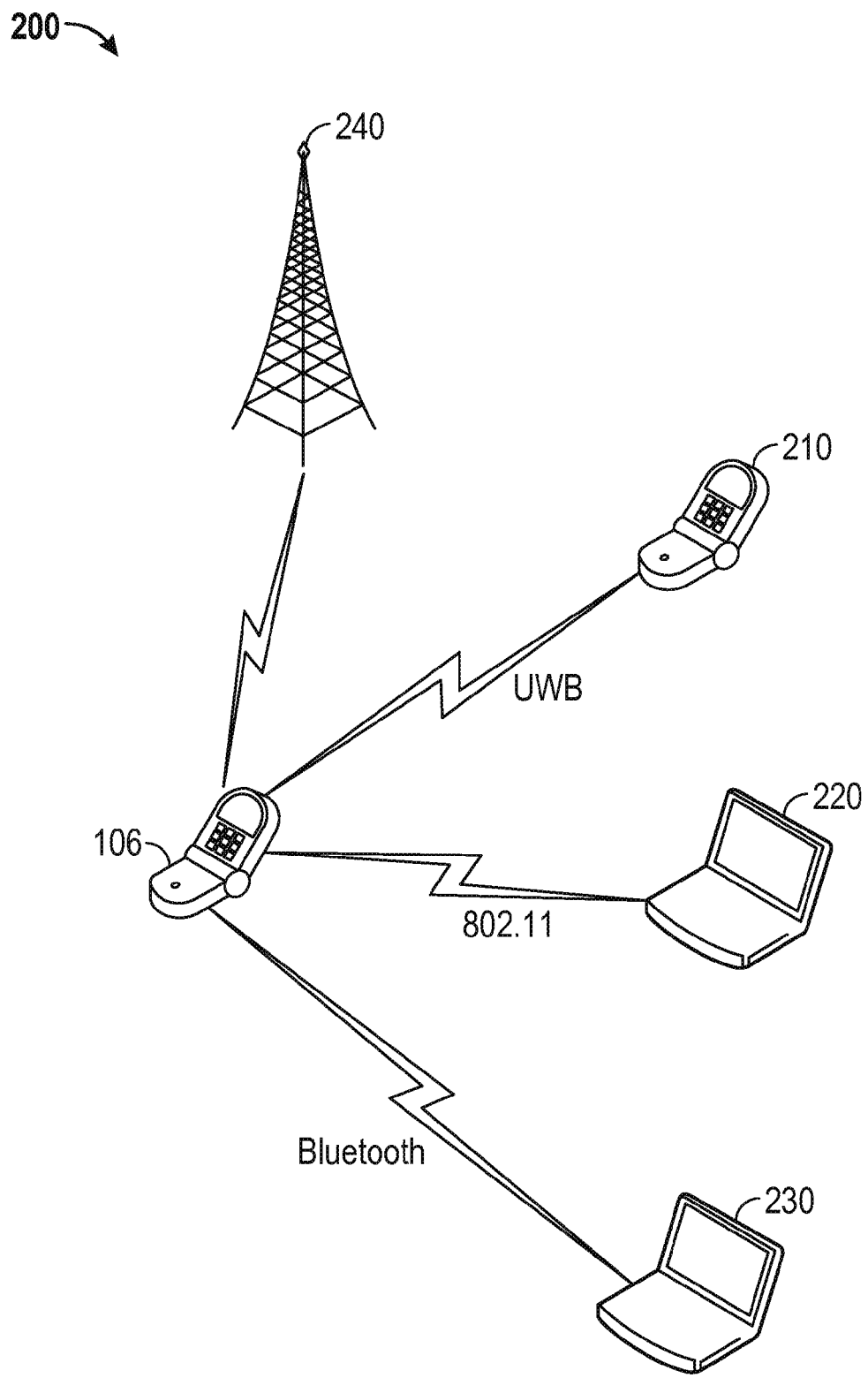
FIG. 2 shows an example of a functional block diagram of an exemplary mobile device operating in a wireless communication network.

An access terminal 106 may be multimode, capable of operating using different radio access technologies (RATs) such as radio access technologies defined by standards such as cdma2000 1x, 1x-EV-DO, LTE, eHRPD and the like. An access terminal 106 may perform a plurality of tasks across various communication systems using different radio access technologies. The communication may be accomplished using a plurality of collocated transmitters or may be communicated using one single transmitter. FIG. 2 shows an example of a functional block diagram of an exemplary access terminal 106 operating in a wireless communication network 200. The wireless communication network 200 comprises the access terminal 106, a second wireless communications device 210, a third wireless communications device 220, a fourth wireless communications device 230, and a cellular tower 240. The wireless communication network 200 may be configured to support communication between a multitude of devices, such as the wireless communications devices 106*a*, 210, 220, 230 and tower 240. The mobile wireless communications devices (e.g., 106*a*, 210, and 220) may comprise, for example, personal computers, PDAs, music players, video players, multimedia players, televisions, electronic game systems, digital cameras, video camcorders, watches, remote controls, headsets, and so on. Access terminal 106 may be simultaneously in communication with each of devices 210, 220, 230, and 240 via one or more transmitters collocated on access terminal 106.

With continuing reference to FIG. 2, the access terminal 106 may communicate with other wireless communications devices (e.g., 210, 220) over a variety of communication channels. The communication channels may comprise Ultra-Wide Band (UWB) channels, Bluetooth channels, 802.11 channels (e.g., 802.11a, 802.11b, 802.11g, 802.11n), infrared (IR) channels, ZigBee (802.15) channels, or a variety of other channels, as is well known in the art. In one implementation, the channel may be a UWB channel conforming to the ECMA-368 standard. Other channels would be readily recognized as possible as well.

The wireless communications network 200 may comprise a wireless local area network (WLAN) covering a physical area, like a home, office, or a group of buildings. A WLAN may use standards such as, 802.11 standard (e.g., 802.11g), and/or other standards for wireless communications. A WLAN may use peer-to-peer communication in which the wireless communication devices directly communicate with each other. The wireless communications network 200 may also comprise a wireless personal area network (WPAN), spanning, for example, an area of a few meters. A WPAN may use standards such as infrared, Bluetooth, a WiMedia based UWB standard (e.g., ECMA-368), and ZigBee standards, and/or other standards for wireless communications. A WPAN may use peer-to-peer communication in which the wireless communication devices directly communicate with each other. The access terminal 106 may connect to another network, such as a wireless communications network or the Internet, through network 200. The messages sent across the wireless communications network 200 may comprise information related to various types of communication (e.g., voice, data, multimedia services, etc.) and may be of varied degrees of importance to the user of access terminal 106, as described in greater detail below.

Although the following implementations may refer to FIG. 1 or 2, one will recognize that they are readily applicable to other communication standards. For example, one implementation may be applicable in a UMTS communication system. Some implementations may be applicable in an OFDMA communication system. The communication system 200 may further comprise any type of communication system including, but not limited to, a code division multiple access (CDMA) system, a global system for mobile communication system (GSM), a wideband code division multiple access (WCDMA), and an OFDM system.

Figure 3:
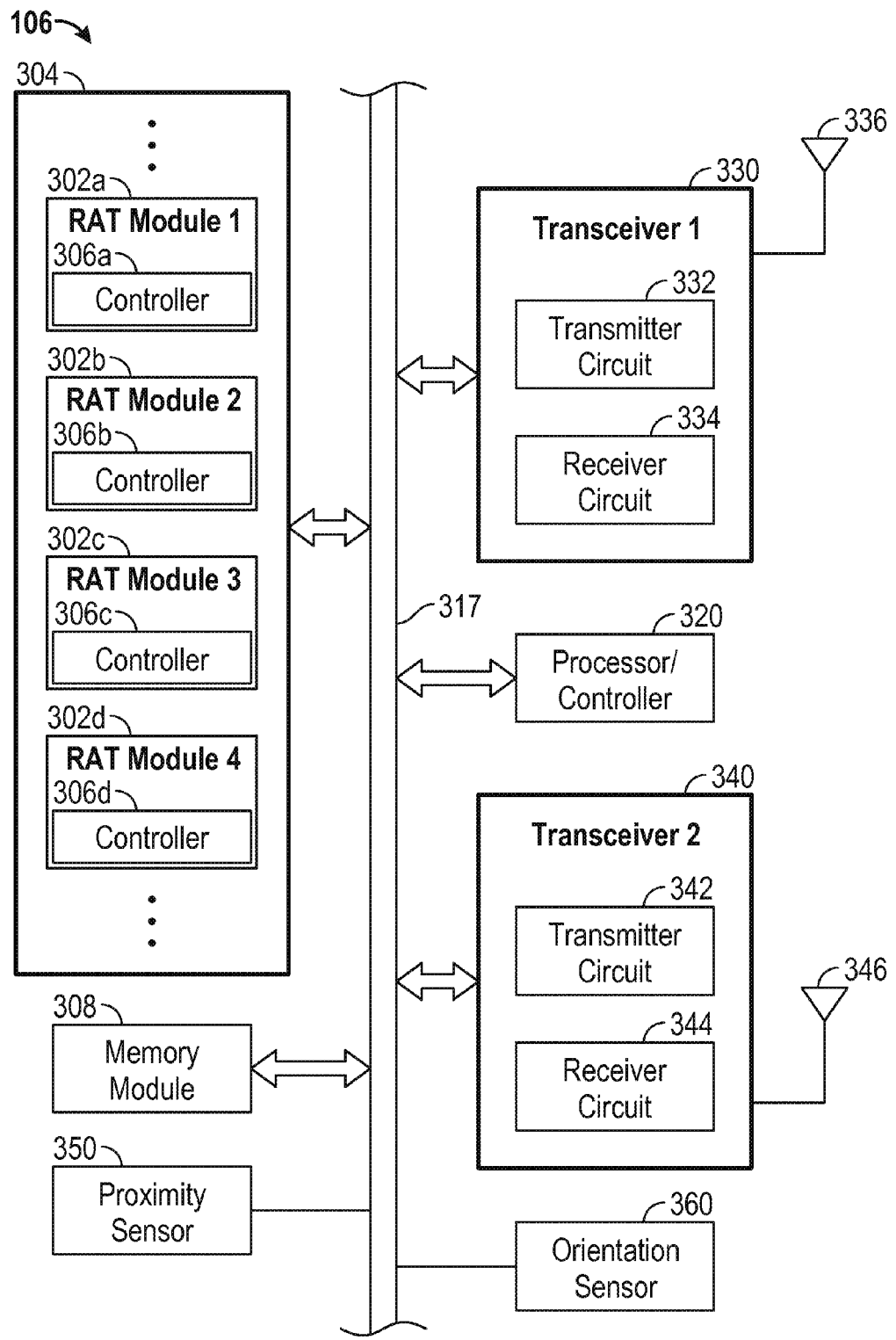
FIG. 3 shows an example of a functional block diagram of an exemplary access terminal shown in FIG. 2.

FIG. 3 shows an example of a functional block diagram of an exemplary access terminal 106 shown in FIG. 2. The access terminal 106 may be multimode, capable of operating using different radio access technologies (RATs) such as any of the radio technologies mentioned above with reference to FIGS. 1 and 2. The access terminal 106 is an example of a device that may be configured to implement the various methods described herein. The access terminal 106 may implement any of the devices illustrated in FIGS. 1-2.

The access terminal 106 comprises a central data bus 317 linking several circuits together. The circuits include a controller/processor 320, a transceiver 330, a memory unit 308, and RAT circuitry 304 which may include various radio access technology modules such as modules 302*a*, 302*b*, 302*c* and 302*d*. The processor/controller 320 may comprise or be a component of a processing system implemented with one or more processors. The processor/controller 320 may be configured as or referred to as an application processor 320 in some implementations. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In some implementations, each RAT module 302*a*, 302*b*, 302*c*, and 302*d* may have a separate antenna and or may have a controller 306*a*, 306*b*, 306*c*, and 306*d* which may also perform one or more of the functions as described with reference to the processor 320.

The transceiver 330 is linked to an antenna 336. If the access terminal 106 does not rely on any wireless links for data exchanges, the antenna 336 can be dispensed with. Furthermore, the access terminal may use multiple antennas or any combination of a number of transceivers or antennas.

The transceiver 330 includes a transmitter 332 and a receiver 334. The transceiver 330 processes and converts the high-frequency (HF) signals to the base-band signals, and vice versa, via the transmitter 332 and the receiver 334. The receiver 334 in turn processes and buffers received signals before sending out to the data bus 317. On the other hand, the transmitter 332 processes and buffers the data from the data bus 317 before sending out of the access terminal 106. For a single-frequency access terminal 106, one transmitter 332 and one receiver 334 may be included in the transceiver 330.

The processor/controller 320 controls the proper timing by allocating the time slots for the data sensing and processing for the different frequency bands for the transceiver 330. The access terminal 106 may comprise multiple transceivers using one or multiple frequencies. For example, the access terminal 106 may include a second transceiver 340 with a transmitter circuit 342 and a receiver circuit 344. The transceiver 340 may be linked to another antenna 346. In some implementations transceivers 330 and 340 may share an antenna 336. In one implementation, each transmitter 332 and 342 may transmit and receive information associated with a different radio access technology. In addition, for simultaneous voice and data modes, one transmitter 332 may be used for transmitting voice data while another transmitter 342 may be used for transmitting non-voice data. For example, a first transmitter 342 may be used for transmitting and receiving 1x voice data while a second transmitter 342 may be used for data only (DO) LTE. The transceivers 330 and 340 and/or antennas 336 and 346 may be located in different locations in the access terminal 106. The processor/controller 320 directs the multiple transmitters 332 and 342 and receivers 334 and 344 for detecting and/or processing of signals from the different frequency bands.

It should be noted that part of the transceiver 330 can be implemented as an external circuit, such as an external modem, pluggable to the access terminal 106.

In addition, the processor/controller 320 performs the function of data management of the data bus 317 and the function of general data processing, including executing the instructional contents of the memory unit 308. The memory unit 308 may include a set of modules and/or instructions. Instructions particular to the process steps of the access terminal 106 as shown and described in the implementations described below can be coded in the various functions included in the contents of the memory unit 308. In one implementation, the memory unit 308 is a RAM (Random Access Memory) circuit. Some communication device functions, such as the handoff functions, are software routines, modules and/or data sets. The memory unit 308 can be tied to another memory circuit (not shown) which either can be of the volatile or nonvolatile type. As an alternative, the memory unit 308 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. In addition, the memory unit 308 can be a combination of ASIC and memory circuitry of the volatile type and/or non-volatile type.

In addition, the processor/controller 320 may be configured to communicate with and control the operation of various modules configured for different radio access technologies (RATs). Each of modules 302a, 302b, 302c and 302d may implement a specific radio access technology and may each individually include additional memory modules, communication components and functions which are applicable to the radio access technology type implemented by the module. Each module 302a, 302b, 302c and 302d may further include a controller 306a, 306b, 306c, and 306d which may each also be referred to as a modem processor 306a, 306b, 306c, and 306d that may be used to control the operation of each RAT. For ease of reference, the controllers 306a, 306b, 306c, and 306d may hereinafter be referred to as a RAT controller 306. Furthermore the RAT controllers 306a, 306b, 306c, and 306d may be provided independently of each module 302a, 302b, 302c and 302d for controlling the modules. In some implementations, the processor 320 may be configured to perform the functions of the RAT controller 306. Furthermore, each RAT may include its own transceiver(s) including antenna(s) (not shown). The RAT modules may implement any of the RAT types discussed above with reference to FIGS. 1-2. The antennas 336 and 346 may be located at different locations within the access terminal 106. For example, the antennas 336 and 346 may be at opposite (e.g., distal) ends or corners of the access terminal 106 or adjacent to each other, or the antennas 336 and 346 could be one opposite sides of the access terminal 106.

The access terminal 106 may further include a proximity sensor 350 that may be configured to detect a proximity of the user with respect to the access terminal 106. The access terminal 106 may further include an orientation sensor 360 such as an accelerometer that may be configured to detect the orientation of the access terminal 106 with respect to the user of the access terminal 106.

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, modules, units, blocks, and the like, such as shown and described in FIG. 3.

Although described separately, it is to be appreciated that functional blocks described with respect to the access terminal 106 need not be separate structural elements. For example, the processor 320, the memory 308, and the RAT modules 302a, 302b, 302c and 302d may be embodied on a single chip. The processor 320 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

Figure 4A:
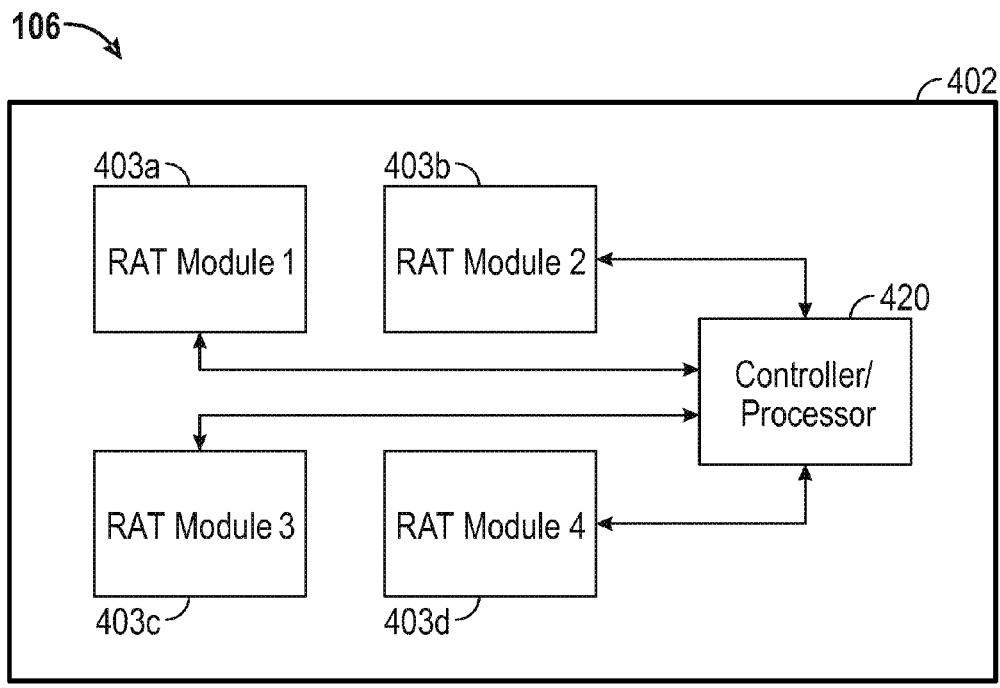
FIG. 4 shows an example of a chip configuration for multiple radio access technologies incorporated into an access terminal.
Figure 4B:
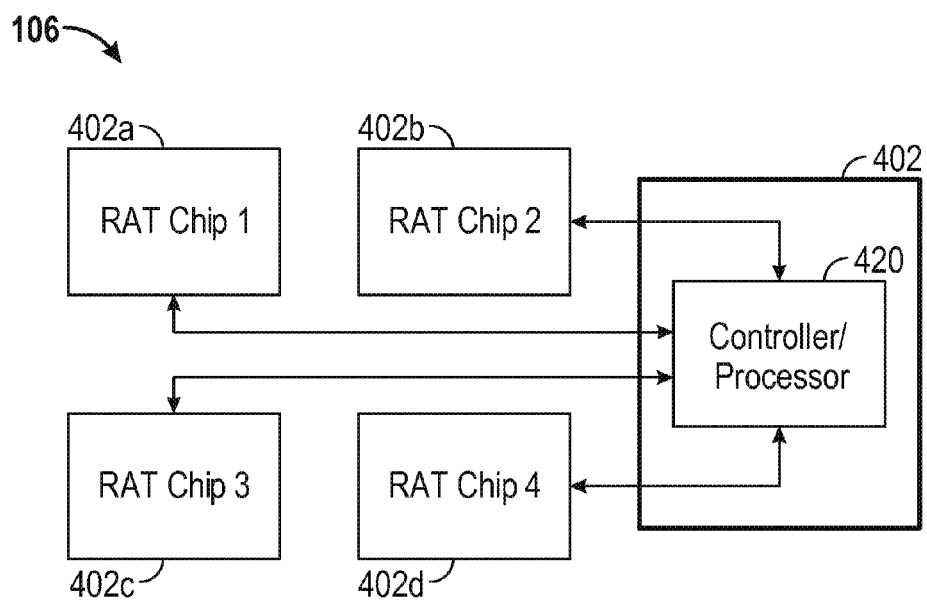

FIGS. 4A and 4B show two exemplary configurations for an access terminal 106 which implements multiple radio access technologies. FIG. 4A shows an exemplary configuration for access terminal 106 showing different radio access technologies implemented on a single chip 402. The chip 402 includes a controller/processor 420. The chip further includes radio access technology modules 403a, 403b, 403c and 403d. Each of the modules 403a, 403b, 403c and 403d may implement a different radio access technology, such as those discussed above with reference to FIGS. 1-2.

FIG. 4B shows an exemplary configuration for access terminal 106 showing different radio access technologies implemented on separate chips. A chip 402 may include a controller/processor 420. Each radio access technology may be implemented on different chips 402a, 402b, 402c and 402d. The processor/controller 420 may control the operation of each of the chips 402a, 402b, 402c and 402d. Each chip 402a, 402b, 402c and 402d may further include individual processors/controllers (not shown), memory modules (not shown), as well as other components applicable to the radio access technology implemented.

Wireless communication devices (e.g., mobile cell phones, personal data assistants, laptops, etc.) are generally subject to regulatory radio frequency (RF) safety requirements. These systems operate within specific guidelines before they can enter the market. For example, devices operating near the human body are evaluated to determine the Specific Absorption Rate ("SAR") their electromagnetic waves produce. SAR is the time-rate of electromagnetic energy absorption per unit of mass in a lossy media, and may be expressed as:

$$SAR(r) = \frac{\sigma(r)}{\rho(r)}|E(r)|^2_{rms} \quad \text{(Equation 1)}$$

Where E(r) is the exogenous electric field at point r, while σ(r) and ρ(r) are the corresponding equivalent electrical conductivity and mass density, respectively. Generally, SAR testing evaluates the amount of energy absorbed into the body from such devices with a single or multiple transmitters. Under one requirement, devices operating at distances beyond 20 cm may be evaluated through a maximum permissible exposure ("MPE") calculation or measurement.

Compliance with the SAR requirement may be a challenge where a device may be required to be compliant with all active transmitters/antennas. In many existing devices, SAR compliance is achieved by determining a fixed maximum transmission power limit which may not be exceeded during the operation of the access terminal 106. When determining the transmission power limit, the features enabled on an access terminal 106 and the mode of use may need to be taken into account. For example, the SAR experienced by a user of a cell phone while the phone is held next to the head may be higher than otherwise due to the relative proximity of the transmitter and the user's body. In addition, an access terminal 106 temporarily configured as a mobile hotpot (e.g., used to provide interne access to a laptop via a cellular phone's wireless communications network) may increase RF transmissions and thereby increase the SAR experienced by a user when the hotspot is activated. In many existing devices, the maximum transmission power limit is set at a fixed value which accounts for the access terminal 106 operating modes just described. As such, the fixed value is always used to limit the maximum transmission power limit regardless of whether, for example, the device is in close proximity to a user's body, or whether certain features, such as hotspots, are currently enabled. In one aspect, this may result in limiting the power transmission level even when it may be unnecessary to achieve SAR compliance according to the access terminal's 106a current operating mode. As such, there is a need for adjusting power transmission levels so as to provide flexibility given various operating modes. A system, apparatus and method are provided to allow for dynamically adjusting a transmission power characteristic depending on the operating mode of the device.

As such, certain implementations described herein are directed to selecting a transmission power limit based on the detected operating mode of an access terminal 106. As mentioned above, the operating mode may correspond to, for example, the proximity of a user to the access terminal 106. A proximity sensor 350 may be used to detect the proximity of the user. When an access terminal 106 detects that the proximity sensor 350 is triggered/activated, a transmission power limit value may be lowered in order to achieve SAR compliance. Conversely, when the access terminal 106 determines that the proximity sensor 350 is no longer activated, the transmission power limit may be raised as the SAR of any electromagnetic radiation experienced by the user may be less than otherwise.

Similarly, an operating mode may correspond to the detected orientation of a device. As the SAR may be higher or lower based on the exact position of the transmitter located within the access terminal 106 (e.g., such as in the upper right corner of a mobile phone) with respect to the user's body, the orientation of the device may determine the current SAR. When an access terminal 106 detects a certain orientation (e.g., using an orientation sensor 360) which corresponds to an orientation indicating that the transmitter is in close proximity with the user's body, a transmission power limit may be lowered in order to achieve SAR compliance. Conversely, when the access terminal 106 detects an orientation indicating that the transmitter is pointed away from a user's body, the transmission power limit may be raised as the SAR of any electromagnetic radiation experienced by the user may be less than otherwise.

As also mentioned above, an operating mode may correspond to whether a certain communication feature of the access terminal 106, such as using the access terminal as a mobile hotspot, is activated. The activated mobile hotspot may increase the access terminal transmission rate and thereby increase the SAR of users in close proximity. When an access terminal 106 detects that a mobile hotspot is enabled, a transmission power limit may be lowered (i.e., the access terminal 106 may back-off the transmission power limit) in order to achieve SAR compliance. Conversely, when the access terminal detects that the mobile hotspot is no longer activated, the transmission power limit may be raised as the SAR of any electromagnetic radiation experienced by the user may be reduced.

Furthermore, any combination of the operating modes described above may impact that power transmission level needed to achieve SAR compliance. For example, an access terminal's 106a mobile hotspot may be activated simultaneously while the user is using the access terminal on a phone call and placing the phone next to the user's ear. In this scenario, the transmission power allowed to achieve SAR compliance may be adjusted to handle the various combinations of operating modes possible. Further, the operating modes described above are exemplary. Any other operating modes which may affect the SAR experienced by the user due access terminal 106 transmissions may be detected and used to adjust the transmission power limit in accordance with the detected operating mode or any combination thereof. Other operating modes will be known by persons/one having ordinary skill in the art.

It should also be appreciated that transmission power levels may be dynamically adapted according to various criteria for other purposes other than for achieving SAR compliance in view of various possible operation modes. Implementations for dynamically changing transmission power limits may be applied according to various operation modes for reasons not related to achieving SAR compliance. Furthermore, implementations for dynamically changing transmission power limits may further be applied in situations not related to device operating modes, but rather to other situations in which it may be desirable to adapt transmission power characteristics.

An access terminal 106 may therefore be configured to adjust a transmission power limit according to the various operating modes and any combinations thereof. This is in contrast to a fixed transmission power limit which is limited by a worst-case operating mode of the access terminal 106. Because of the variety of operating modes available, a variable number of adjustments to the transmission power limit can be made based on each combination of operating modes. To provide the adjustments, in one implementation, an access terminal 106 provides a determined number of pre-configured transmission power limits corresponding to various operating modes. The access terminal 106 may provide the pre-configured transmission power limits for each radio access technology (RAT) implemented by the access terminal 106 and further provide transmission limits for other transmission characteristics of each RAT as will be further described below. The power transmission levels may be stored in look-up tables (LUTs) associated with various communication characteristics that may be indexed by a determined number of values corresponding to various operating modes. The pre-configured transmission power limits may correspond to limits while operating in Non-Simultaneous Voice and Data (Non-SVD) mode. However, implementations described herein may be further adapted for use in Simultaneous Voice and Data (SVD) mode as will be described below.

For example, a determined number of operating mode indexes may be defined for an access terminal 106, where each index may be described as a device state index (DSI). Each DSI may correspond to some operating mode or combination of operating mode detected by the access terminal 106. An access terminal 106 may provide the DSI as an index to a LUT which specifies a transmission power limit to be used for that DSI. Multiple transmission power limits may be determined for each DSI based on each RAT type, each band-class of the RAT type, each configuration of the RAT (e.g., modulation type), for certain channels of the RAT, etc. as will be further described below. A LUT, indexed by the DSI, may be provided for each combination of the communication characteristics just described, where each LUT may specify the transmission power limits to be used corresponding to each DSI.

As such, a determined number of DSIs are provided. Another component, such as a processor 320, may determine what operating modes or combinations correspond to each DSI. In one aspect, this allows for flexibility in determining the choices of states of sensors, mobile hotspot attributes, or other device attributes chosen for a DSI and used to determine pre-configured power limits. For example, an original equipment manufacturer (OEM) who is developing a mobile smart phone or tablet computer may determine the hardware, sensors, features, and other device attributes which are supported by the device. Each of the different design choices and the type or method of using the device may impact the SAR experienced by the user. In one implementation, the OEM may configure the access terminal 106 and map operating modes with SAR implications to an applicable DSI according to the features of the access terminal 106. In operation, the processor 320 configured by the OEM may be configured to detect the desired operating mode and map the operating mode to an applicable DSI. Once the desired DSI is chosen, a RF component, such as a RAT controller 306 component, may be able to use the DSI as an entry into the LUTs for determining the appropriate power limit at which to operate. The DSI may be provided to all RAT controllers 306a, 306b, 306c, and 306d (controlling different RATs or components of a RAT) that are configured to adjust power transmission limits. In one aspect, this provides flexibility by not requiring dynamic power transmission levels to be limited to device or hardware specific operating modes, so as to allow a variety of devices with a variety features to take advantage of flexible transmission power limits to achieve SAR compliance without sacrificing too much power transmission.

According to one implementation, while the DSI may be able to be selected by application level components, the transmission power limits stored in the LUTs may not be allowed to be configured. For example, a processor 320 may be able to provide a DSI value to a RAT controller 306, but would not be able to provide any further information about specific power transmission levels desired. Each relevant RAT controller 306 then uses the DSI to determine the power transmission limit corresponding to the DSI. In one aspect, this limits the opportunities for application level components, or someone not well-versed in RF, to configure the transmission power limits. Furthermore, if application level components are allowed to dynamically change transmission power limits, the FCC may view the device as Software Defined Radio (SDR) and require certain certifications of the device for every software release. In another implementation, the processor 320 may be able to provide some information regarding specific power transmission levels desired according to various operating modes. In this case certain implementations may provide for safeguarding against unsupported or improper transmission power levels. Furthermore, configuring different choices for determining a device state index and corresponding mappings to operation modes may be performed only at compile time.

Figure 5:
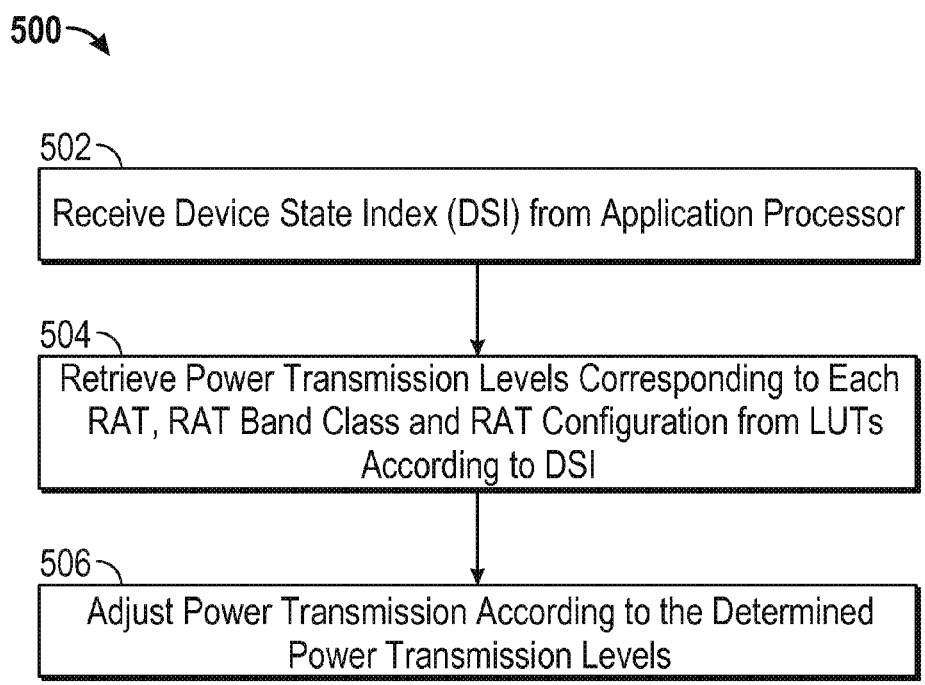
FIG. 5 shows a flowchart of an implementation of an exemplary method for determining power transmission levels based on a device state index.

FIG. 5 shows a flowchart of an implementation of an exemplary method 500 for determining power transmission levels based on a device state index according to the implementation described above. At block 502, a device state index is received from an processor 320 or other controller. The number of DSIs available to the processor 320 may be preconfigured. At block 504, power transmission levels corresponding to each RAT, RAT band-class, RAT configuration, and other communication parameters/characteristics are retrieved from LUTs according to the DSI received. The DSI may be used an index directly into a LUT to retrieve a single transmission power value. In one aspect, the transmission power levels may be expressed as signed, 16-bit integers with one lowest significant bit (LSB) representing 1/10 dBm. At block 506, the power transmission level is adjusted according to the power transmission levels or limits provided by the LUTs.

For each RAT, RAT band-class, RAT configuration, etc, a default transmission power table may be provided when applicable. This table may have a single element/value corresponding to a default transmission power for the particular communications characteristic involved. In one implementation, application level components may be unable to configure the default transmission power table. Furthermore, a predetermined DSI value, such as the value zero, may be chosen to correspond to the default transmission power table. When an access terminal 106 first starts-up, the DSI may be initialized to zero and default to the power transmission levels defined by the default transmission power table. Furthermore, the default transmission power table may be configured to be used any time that system access transmission state is being used. If a received DSI value is outside of the range of the preconfigured number of DSIs, the default DSI value of zero may be used which corresponds to the configured default power transmission table values.

As mentioned above, transmission power levels for a variety of communication parameters/characteristics (e.g., RAT type, band-class, modulation type, uplink channel, etc.), may be specified according to the DSI value selected. According to one implementation, each combination of parameters may correspond to a power transmission level and therefore a LUT indexed by the DSI may be provided for each combination.

Figure 6:
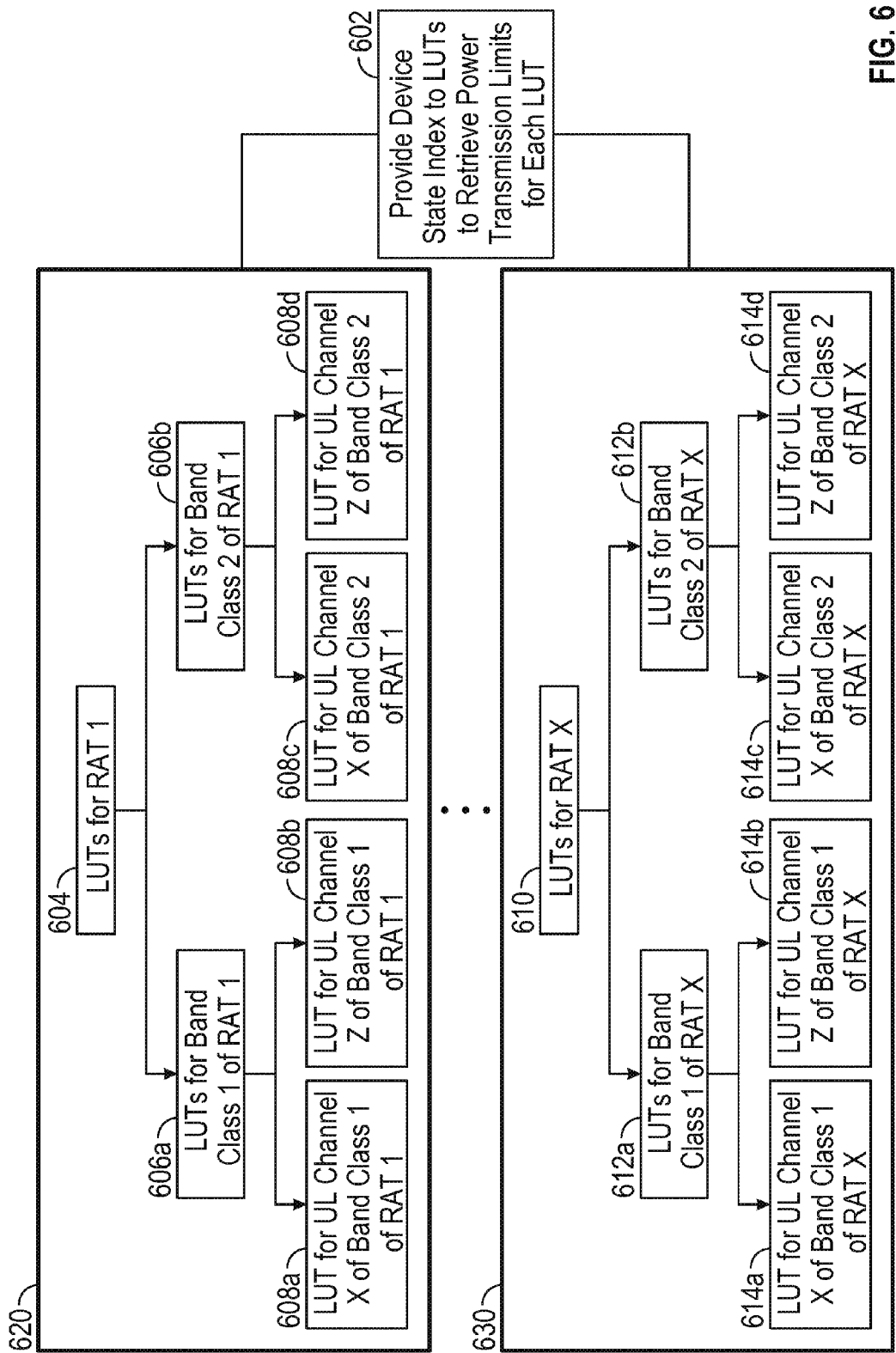
FIG. 6 shows an example illustrating different groups of look-up tables for different radio access technology types.

FIG. 6 shows an example of different groups of LUTs for different RAT types to provide an example of the different possible transmission power levels provided per DSI. In FIG. 6, at 602, a device state index is provided to the LUTs for each RAT. In block 620, the group of LUTs 604 corresponds to power transmission levels associated with a first RAT. A group of LUTs per band-class of the RAT is further provided as shown in blocks 606a and 606b. Furthermore, in the example shown in FIG. 6, a LUT is then provided for each uplink channel of each band-class of the RAT as shown in blocks 608a-608d. The LUTs are provided for any number of RAT technology types for which an access terminal 106 may support. In block 630, the group of LUTs 610 corresponds to power transmission levels associated with RAT X. A group of LUTs per band-class of RAT X is further provided as shown in blocks 612*a* and 612*b*. Furthermore, in the example shown in FIG. 6, a LUT is then provided for each uplink channel of each band-class of the RAT as shown in blocks 614*a*-614*d*. Furthermore, many other communication parameters/characteristics may be provided which correspond to LUTs. For example, other characteristics may include a modulation type, a transmission state (e.g., traffic versus system access), an uplink channel, a call type, or the like as will be further described below. In addition, each type of RAT may have more or less LUTs according to the attributes and characteristics specific to each RAT type. Other communication characteristics/parameters may also have corresponding LUTs as may be determined by a person/one having ordinary skill in the art and which will be further described below.

FIGS. 7A-7B show examples of two exemplary look up tables 700*a* and 700*b* which may be used to determine a transmission power limit according to a device state index. FIG. 7A shows an example showing a LUT 700*a* corresponding to nine possible device state index values, each of which is associated with a different transmission power limit. The LUT 700*a* in FIG. 7A may correspond to a LUT 700*a* for a given RAT, band-class, configuration, RAT transmission state, call type, and device mode. Each combination of a given RAT, band-class, configuration, RAT transmission state, call type, device mode, or any other characteristic affecting transmission power such as temperature, may correspond to a different LUT 700*a* with different values. Furthermore a DSI of zero may correspond to the default transmission power limit. As such, only DSIs 1-8 may be selectable by a processor 320. As shown in FIG. 7A, the transmission power limits specified by each DSI are decreasing in a linear matter as the DSI value increases. FIG. 7B provides another example of a LUT 700*b* corresponding to nine possible DSI values showing the various transmission power limits that may be specified according to the combination of the communication parameters/characteristics described above. The LUTs 700*a* and 700*b* may allow flexibility in choosing the range and specific of transmission power limits available according to the characteristics of each RAT and other device modes. Each of the LUTs 700*a* and 700*b* provided, or any of the LUTs described herein may be stored in a memory module 308. The LUTs 700*a* and 700*b*, or any of the LUTs described herein may be stored in a memory module 308 located an a chip for each RAT, or may be located on a single chip configured to control the different RAT types according to the configurations shown, for example, in FIG. 4.

According to one implementation, a LUT may be provided to determine transmission power limits associated with each DSI according to various communication characteristics/parameters for each RAT type. FIG. 8 provides an example of a portion of a look up table 800 for determining transmission power limits for a given radio access technology type, a band-class, a configuration, a transmission state, a uplink channel, a call type and a device mode. Moreover, FIG. 8 provides another example of the combinations possible for different transmission power limit configurations for each DSI. Each row of the LUT 800 in FIG. 8 corresponds to the different combinations of the communication parameters/characteristics possible and indicates the transmission power limit for each DSI. Thus, the transmission power limits may be based on any combination of the column headings shown in FIG. 8.

Column 2 of the LUT 800 in FIG. 8 indicates the RAT type as each RAT may be subject to various transmission power limits based on the design parameters associated with the RAT. The third column indicates a possible band-class within each RAT. In the fourth column, the transmission power limits may be specified based on a RAT configuration. This configuration may correspond to, for example, different modulation types used within a band-class, or other RAT specific transmission configurations. In the next column, transmission power limits may be further based on the transmission state of the RAT. For example, the state may be for either the traffic/connected state or a system access state. According to one implementation, adjustable transmission power limits may be ignored for the system access state and configured for the traffic state. If the system access state is being used, then the DSI provided by the application level components may be ignored and the DSI may revert to zero (i.e., the DSI associated with the default transmission limits). Once the access terminal 106 switches to the traffic state, the DSI specified by the application level components may be used to determine the transmission power limit. In column six, transmission power limits may further be determined per uplink channel. As one example, given uplink traffic channels D and E, transmission power limit adjustments may be applied to uplink channel D, but not to channel E.

In the seventh column shown in the LUT 800 of FIG. 8, the transmission power limits may further be based on a type of call. For example, the type of call may be detected as a normal call or an emergency 911 call (E911) to an emergency operator. If the call is an E911 call, it may be desirable to have a high transmission power to ensure that the call remains connected. In this situation, all transmission power limits may be ignored, and any SAR compliance may temporarily be disregarded. In one implementation, if an E911 call is detected, the DSI provided by the application level components may be ignored and a DSI of zero may be used to indicate the default transmission power limits, or all transmission power limits related to SAR compliance may be ignored altogether. In another implementation, a specific DSI, such as a DSI value of one, may be reserved for a call mode such an E911 call. Accordingly, application level components may detect the E911 call and set the DSI value to the reserved value. The DSI index may then be provided to a table which may indicate a single transmission power limit for any combination of communication parameter/characteristic available. Other call types (not depicted) may also affect the transmission power limits that are desirable for which further rows/columns of the table shown in FIG. 8 or individual LUTs can be generated.

Further, as shown in the next column, the transmission power limits may further be based on a device mode. For example, the device mode may correspond to E911 callback mode in which an access terminal can receive a call from Public Safety Answering Point, which is also known as Public Safety Access Point, after an E911 call. In this mode, it may be desirable to maintain high transmission power rates to ensure that an incoming call from emergency personnel is received. In this mode, all transmission power limits may be ignored, and any SAR compliance may temporarily be disregarded. In one implementation, if the mode is activated, the provided DSI may be ignored and a DSI of zero may be used to indicate the default transmission power limits, or all transmission power limits related to SAR compliance may be ignored altogether. Other call modes not described herein may also affect whether to adjust transmission power limits, and for which corresponding rows or LUTs may be generated.

Thus, as shown in the LUT 800 of FIG. 8, rows 1-8 versus rows 10-13 illustrate transmission power limits which correspond to different RAT types. For each RAT type, rows 1-4 and 5-8 illustrate transmission power limits associated with different band-classes supported within the RAT type. Rows 11-13 illustrate transmission power limits which correspond to different configurations, such as different modulation types supported by a given band-class for a given RAT type. Rows 1 and 2 illustrate the transmission power limits associated with different transmission states of the RAT type such as system access versus traffic state. Rows 10 and 11 illustrate the transmission power limits associated with different uplink channels within a band-class for the specified RAT type. Rows 2-4 illustrate the transmission power limits associated with call types as well as device modes such as normal calls versus E911 calls and normal device mode versus E911 call back (CB) modes. In one exemplary implementation, a DSI may be used to determine a column corresponding to all transmission power limits associated with each row (i.e., combination of communication parameters/characteristics). All the values in that column may then be retrieved and provided to further processing components for adjusting power transmission levels based on the new limits.

It should be appreciated that the LUT 800 shown in FIG. 8, shows only a small portion of the possible combinations possible for different transmission power limits for each DSI. Furthermore, other column providing additional communication parameters/characteristics (and therefore other rows) may additionally be provided beyond the columns depicted in FIG. 8 as will be appreciated by a person/one having ordinary skill in the art. Furthermore, different RATs support different parameters/characteristics. For example, one RAT may need to apply transmission power limits to modulation types within a band-class, while other another RAT may only support one modulation type. Thus the rows shown in FIG. 8 may correspond to the various combinations of communication parameters/characteristics supported by each RAT. Furthermore, the LUT 800 shown in FIG. 8 shows just a subset of various examples of transmission power limit values which may be included in the table. Those cells shown in the LUT 800 of FIG. 8 which do not include a transmission power limit value may be populated with appropriate values as necessary. Further, the transmission power limit values shown are merely illustrative of the many values that may be used according to the RAT type, etc. The LUT 800 shown in FIG. 8 may be stored in a memory module 308 and be used to determine all the applicable transmission power limits associated with the DSI at one time. Additionally, as described above, each combination may be associated with individual LUTs, each of which is indexed by the DSI and the transmission power limit retrieved. As different RATs have different capabilities, one RAT may be associated with a different number of LUTs as compared to another RAT. Further logical components and/or circuitry may then be provided to determine how to adjust the transmission power levels based on the retrieved transmission power limits from the single LUT 800 shown in FIG. 8 or the individual LUTs 700a and 700b shown in FIGS. 7A-7B.

According to some implementations, the OEM or other party may have the capability to provision tables with desired transmission power limits based on device operating modes. This may allow, for example, for an OEM to provision a table with transmission power limits which correspond to a DSI. Allowing the tables to be provisioned by the OEM may result in the OEM attempting to specify a transmission power limit that is higher than the transmission power limit supported by the RAT. Furthermore, different RAT types may support different maximum transmission power limits. In one implementation, this is addressed by ensuring that the transmission limit stays at or below the highest transmission power limit supported by the RAT type. In one aspect, this may be accomplished by taking the minimum of what the RAT type allows and the transmission power limit specified by the LUT. For example, a RAT supporting cdma2000 1x may not allow transmissions over +24 dBm. In the case a value over 24 dBm was specified, the value would be ignored and the 24 dBm transmission power level would be used in its place.

Figure 9:
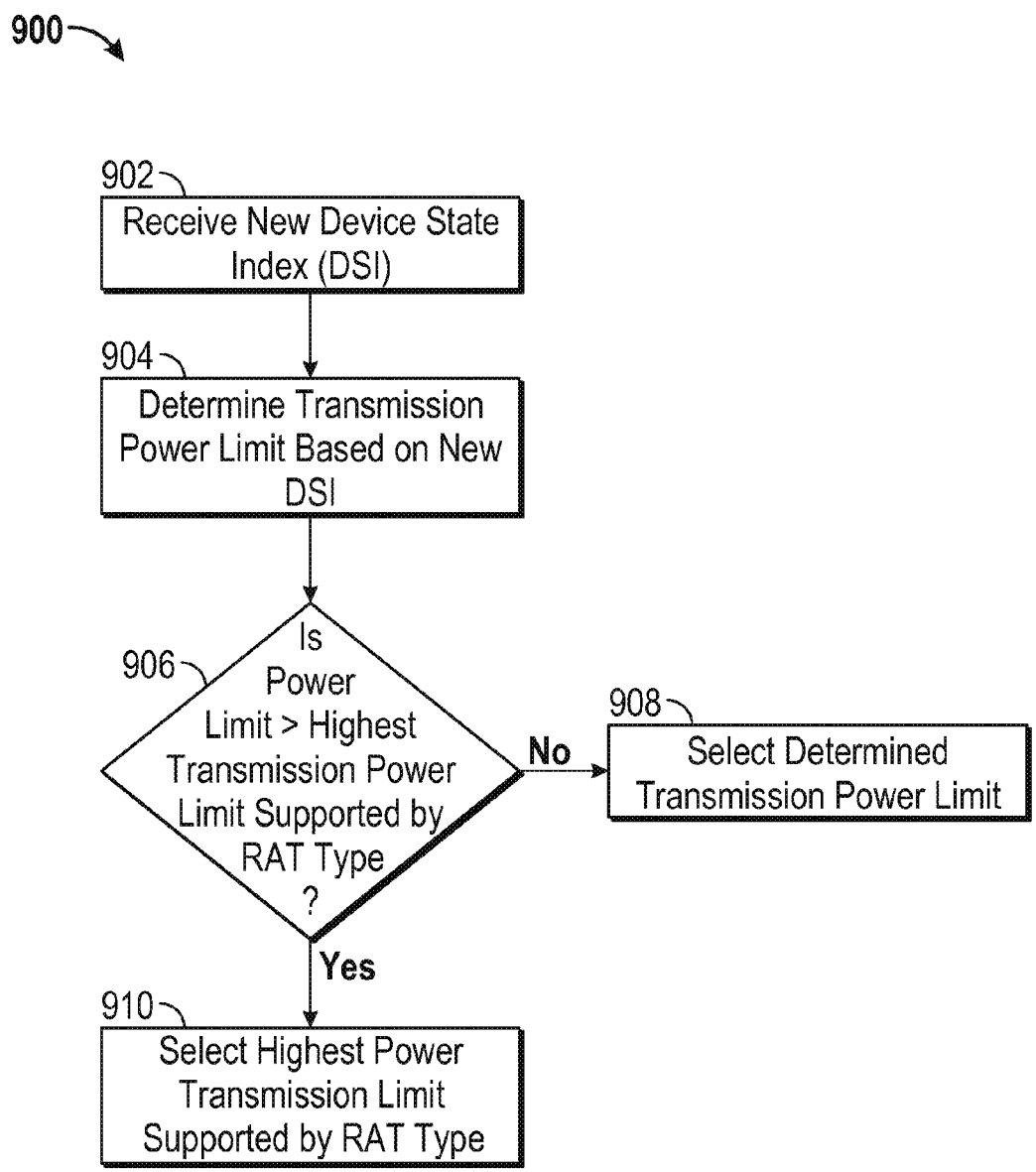
FIG. 9 shows a flowchart illustrating an implementation of an exemplary method for determining a transmission power limit according to a provided device state index.

FIG. 9 shows a flowchart illustrating an implementation of an exemplary method 900 for determining a transmission power limit according to a provided DSI to address this situation. At block 902, a new DSI is received. This DSI may be associated with transmission power limits provisioned by a third party or may be associated with the pre-configured transmission power limits discussed above. At block 904, the transmission power limit associated with the new DSI is determined by using a LUT as described above. At block 906, the determined transmission power limit is compared against the highest transmission power limit supported by or configured for a RAT type. If the determined transmission power limit is less than the highest transmission power limit supported by the RAT type, then At block 908, the determined transmission power limit is selected. If the determined transmission power limit is greater than the highest transmission power limit supported by the RAT type, then At block 910, the highest transmission power limit supported by the RAT type is selected and the determined transmission power limit is disregarded. The blocks described in FIG. 9 may be repeated for each RAT type. A processor 320 or a RAT controller 308 may be configured to perform the functionality described in the blocks shown in FIG. 9.

Figure 10:
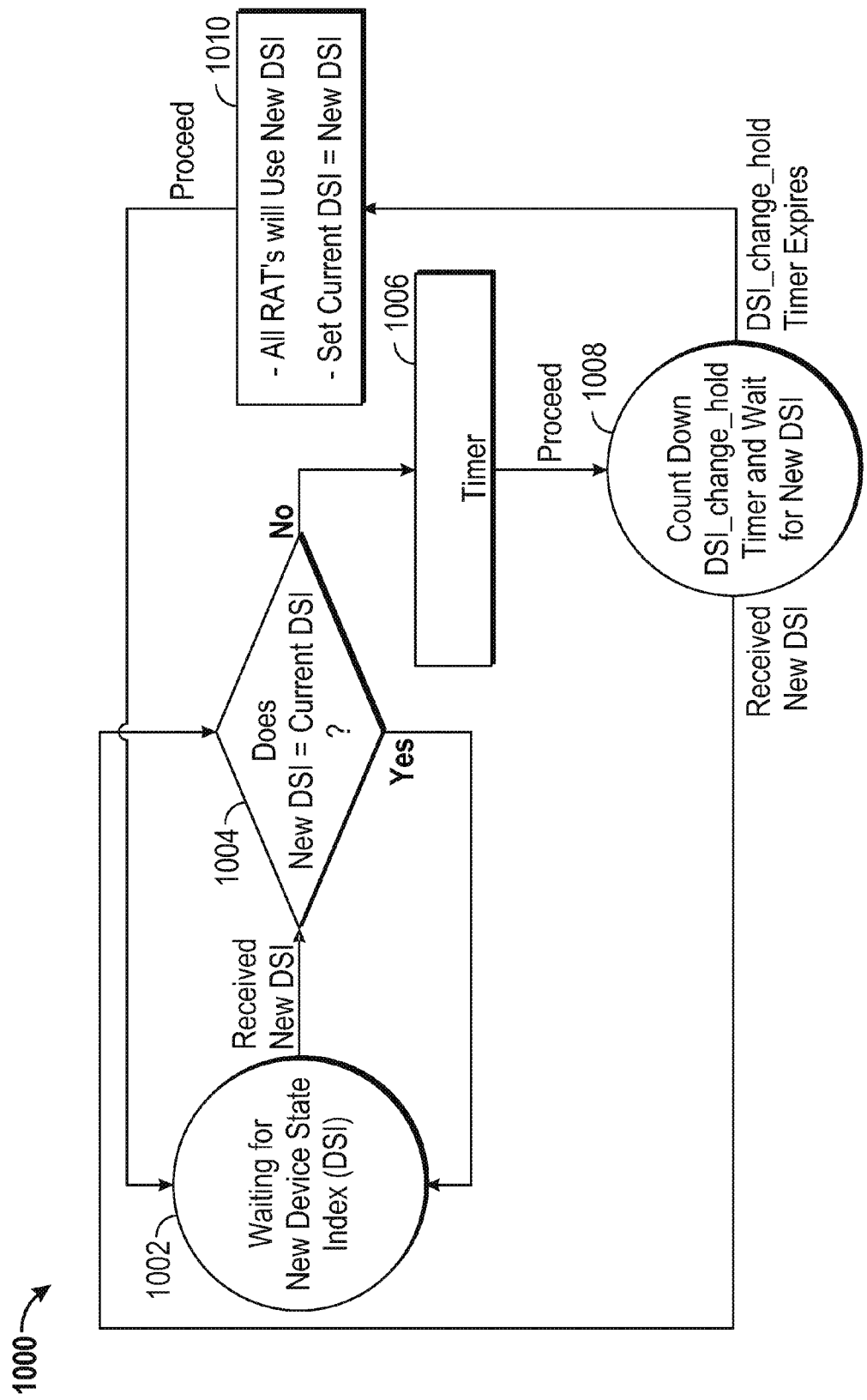
FIG. 10 shows a flowchart illustrating an implementation of an exemplary method for filtering device state index values over a period of time.
Figure 11:
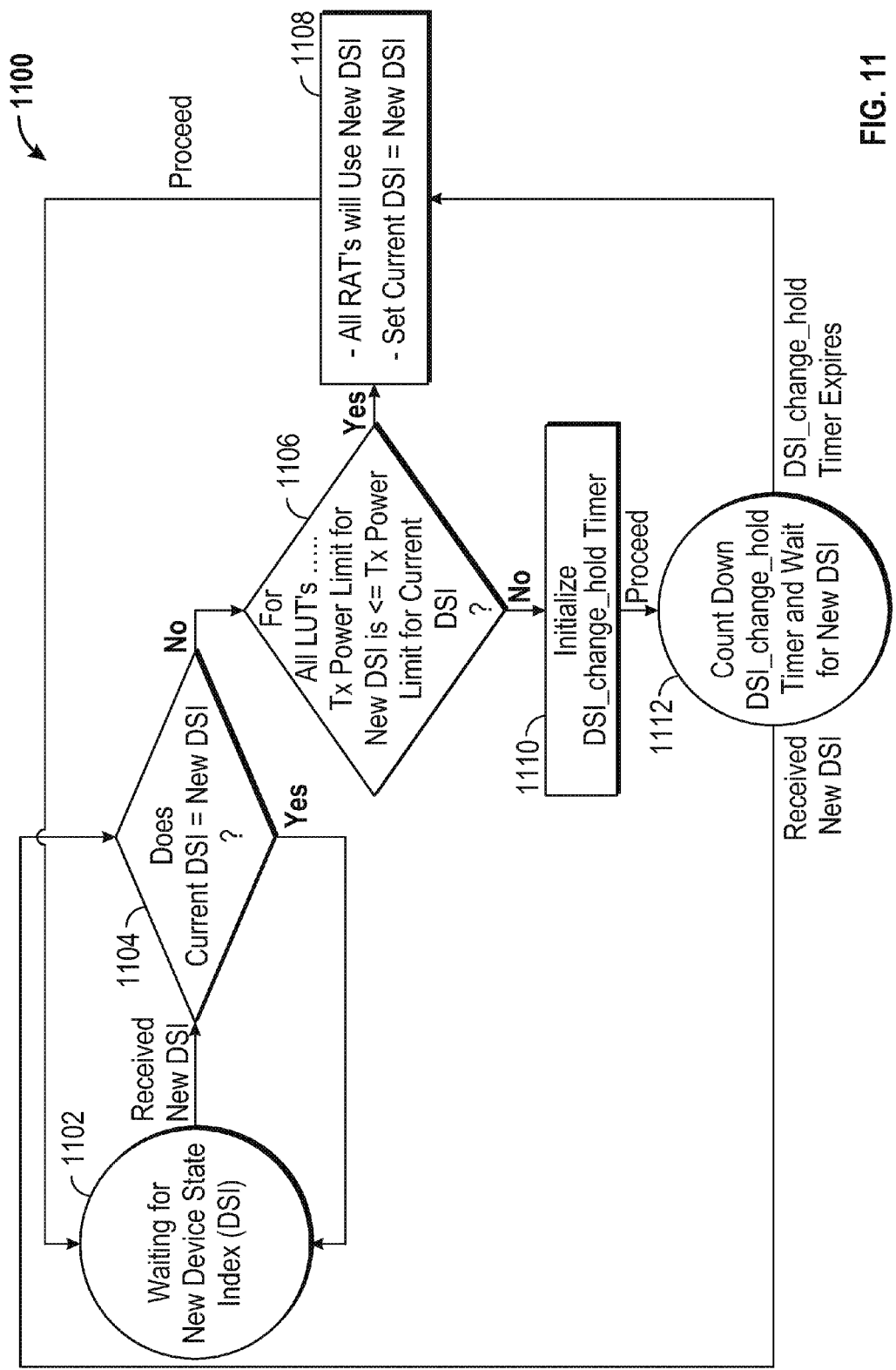
FIG. 11 shows a flowchart illustrating an implementation of another exemplary method for filtering device state index values over a period of time.
Figure 12:
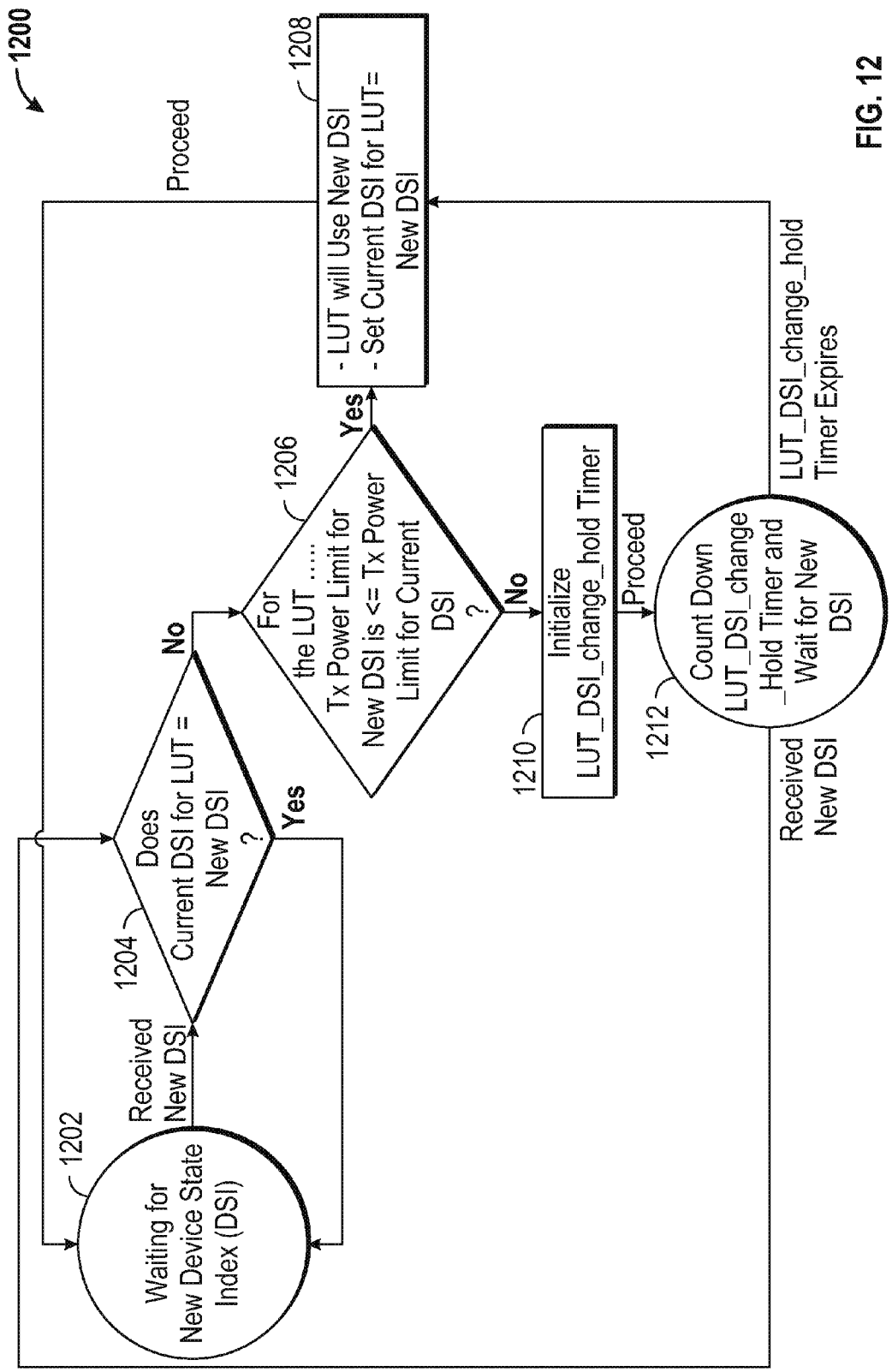
FIG. 12 shows a flowchart illustrating an implementation of another exemplary method for filtering device state index values over a period of time.

In some scenarios, the operating mode of the device may rapidly change. For example, if a user is continuously moving a mobile cell phone, the proximity sensor 350 may be continuously activated/de-activated within a short period of time. In this situation a processor 320 may be constantly providing a series of different DSI values over a short period of time. This could result in the device rapidly adjusting the transmission power levels of the device which may lead to a waste in processing and in erratic transmission power levels. In one implementation, filtering of DSI values over time is provided to filter out rapid/un-sustainable changes in DSI values received from a processor 320. FIGS. 10-12 show flowcharts illustrating various implementations of exemplary methods for filtering DSI values to avoid rapid/un-sustainable operating mode changes (e.g., using hysteresis).

FIG. 10 shows a flowchart illustrating an implementation of an exemplary method 1000 for filtering device state index values over a period of time. At block 1002, a processor 320 waits for a new DSI to be received from a processor 320. When a new DSI is received, the new DSI received is compared against the current DSI being used by each RAT At block 1004. If the new DSI and the current DSI are equal, flow is returned to block 1002 to wait for a new DSI which is different than the current DSI. If the new DSI is different than the current DSI, a timer is initialized as shown in block 1006. Flow continues to block 1008 where the timer counts down while additionally waiting for any new DSI to be received from a processor 320. If a new DSI is received while the timer is still counting down, the flow returns to block 1004 where the new DSI is again compared to the current DSI used currently by each RAT, and the steps of blocks 1004 through 1008 are repeated. If the timer expires and no new DSI has been received, then the new DSI may be used by all RAT types and the current DSI may be set to the new DSI in block 1010. A processor 320 may then wait again for a new DSI in block 1002 and the operations described by each of the blocks is repeated. According to this implementation, a change in DSI may not take effect until the change persists longer than a specified time duration. Otherwise, the change in DSI may not be propagated to each RAT implemented by the access terminal 106. A processor 320 or a RAT controller 308 may be configured to perform the functionality described in the blocks shown in FIG. 10.

According to one possible implementation, the transmission power limit may be non-increasing (or non-decreasing) as the value of the DSI goes up. As all LUTs may reference one common DSI, the transmission power limit may decrease for increasing DSI values for a multiple of different combinations of RAT communication characteristics described above. As such, according to one implementation, the transmission power limits may be arranged in a trend. Accordingly, a change in transmission power limit in one direction (e.g., increasing or decreasing) may be aggressive (i.e., using no time hysteresis), while a change in transmission power limit in the opposite direction may be conservative (i.e., use time hysteresis to ensure that only appropriate DSI changes are propagated). For example, if the transmission power limit needs to be decreased for SAR compliance, it may need to take place as soon as possible. However, when the transmission power limit is raised, caution may be exercised such that only sustainable DSI changes are propagated.

FIG. 11 shows a flowchart illustrating an implementation of an exemplary method 1100 for filtering device state index values over a period of time according to the implementation just described. At block 1102, a processor 320 waits for a new DSI to be received from a processor 320. When a new DSI is received, the new DSI received is compared against the current DSI being used by each RAT at block 1104. If the new DSI and the current DSI are equal, flow is returned to block 1102 to wait for a new DSI which is different than the current DSI. If the new DSI is different than the current DSI, then for all LUTs, the transmission power limit for the new DSI is compared against the transmission power limit for the current DSI in block 1106. If the transmission power limit for the new DSI is less than or equal to the transmission power limit for the current DSI for all LUTs then the new DSI is propagated to each RAT and the new DSI may be set to the current DSI in block 1108. This corresponds to a situation in which it is desirable to decrease transmission power limits to achieve SAR compliance as soon as possible.

If the transmission power limit for the new DSI is not less than or equal to the transmission power limit for the current DSI for all LUTs, then a timer is initialized as shown in block 1110. Flow then continues to block 1112 where the timer is configured to count down while additionally waiting for any new DSI to be received from a processor 320. If a new DSI is received while the timer is still counting down the flow returns to block 1104 where the new DSI is again compared to the current DSI used currently by each RAT, and the steps of blocks 1104 through 1112 are repeated. If the timer expires and no new DSI has been received, then the new DSI may be used by all RAT types and the current DSI may be set to the new DSI in block 1108. A processor 320 may then wait again for a new DSI in block 1102 and the operations described by each of the blocks is repeated. The flow described starting in block 1110 corresponds to the situation in which the transmission power limit is being increased as compared to the current transmission power limit and only sustainable changes in DSI should be propagated. A processor 320 or a RAT controller 308 may be configured to perform the functionality described in the blocks shown in FIG. 11.

The implementation described with reference to FIG. 11 can be adapted for the reverse situation. For example, according to another implementation, it may be desirable to immediately propagate changes in new DSI values when the transmission power limit increases, while exercising caution in propagating changes in new DSI values when the transmission power limit decreases. Accordingly, the logic described in block 1106 may be reversed. In this situation a new DSI would be immediately propagated to the RATs when the transmission power limit for the new DSI is greater than or equal to the transmission power limit for the current DSI for all LUTs. And conversely, the timer would be set when the transmission power limit for the new DSI is less than the transmission power limit for the current DSI for all LUTs, such that only sustainable DSI changes are propagated to the RATs.

According to another possible implementation, the transmission power limit corresponding to a DSI in one LUT may increase, while the transmission power limit corresponding to the same DSI in another LUT may decrease. In this situation, flexibility for whether or not to rapidly propagate DSI changes may still be desirable. Accordingly, DSI change propagations may be configured for each LUT rather than for all RATs as described with reference to FIG. 11. As such, each LUT may have its own local "current DSI" as opposed to a "global" current DSI as shown with reference to FIG. 11. Furthermore, each LUT may have its own local timer value (i.e., amount of time hysteresis) for use in determining whether to propagate a DSI change for the LUT.

FIG. 12 shows a flowchart illustrating an implementation of an exemplary method for filtering device state index values over a period of time according to the implementation just described. The flowchart described in FIG. 12 may be applied for each LUT. At block 1202, a RAT controller 308 waits for a new DSI to be received from a processor 320. When a new DSI is received, the new DSI is compared against the current DSI being used by each LUT at block 1204. If the new DSI and the current DSI for the LUT are equal, flow is returned to block 1202 to wait for a new DSI which is different than the current DSI for the LUT. If the new DSI is different than the current DSI, for the LUT, the transmission power limit for the new DSI is compared against the transmission power limit for the LUT's current DSI in block 1206. If the transmission power limit for the new DSI is less than or equal to the transmission power limit for the LUT's current DSI then the LUT may use new DSI and the new DSI may be set to the LUT's current DSI in block 1208. This corresponds to a situation in which it is desirable to decrease transmission power limit for the LUT to achieve SAR compliance as soon as possible.

If the transmission power limit for the new DSI is not less than or equal to the transmission power limit for the LUT's current DSI, then a timer associated with the LUT is initialized as shown in block 1210. Flow then continues to block 1212 where the timer is configured to count down while additionally waiting for any new DSI to be received from a processor 320. If a new DSI is received while the timer is still counting down the flow returns to block 1204 where the new DSI is again compared to the current DSI used currently by the LUT, and the steps of blocks 1204 through 1212 are repeated. If the timer expires and no new DSI has been received, then the LUT may use the new DSI and the LUT's current DSI may be set to the new DSI in block 1208. A processor 320 may then wait again for a new DSI in block 1202 and the operations described by each of the blocks is repeated. The flow described starting in block 1210 corresponds to the situation in which the transmission power limit is being increased as compared to the LUT's current transmission power limit and only sustainable changes in DSI for the LUT may be propagated. Accordingly, the operations described with reference to blocks in FIG. 12 may be repeated for each LUT. A processor 320 or a RAT controller 308 may be configured to perform the functionality described in the blocks shown in FIG. 12.

The implementation described with reference to FIG. 12 can be adapted for the reverse situation. For example, according to another implementation, it may be desirable to immediately propagate changes in new DSI values for an individual LUT when the transmission power limit for the LUT increases, while exercising caution in propagating changes in new DSI value for the LUT when the transmission power limit decreases. Accordingly, the logic described in block 1206 may be reversed. In this situation a new DSI would be immediately propagated to the RATs when the transmission power limit for the new DSI is greater than or equal to the transmission power limit for the current DSI. And conversely, the timer would be set when the transmission power limit for the new DSI is less than the transmission power limit for the current DSI such that only sustainable DSI changes are used by the LUT.

In many cases, when the processor 320 provides a new DSI value, the new transmission power limit retrieved from each LUT may be different than previous transmission power limit. However, in some LUTs the transmission power limit retrieved according to the updated DSI value may be the same as the transmission power limit already being applied. In one implementation, when a RAT controller 306 receives a new DSI value and determines whether to change a transmission power limit, the RAT controller 306 may compare the transmission power limit associated with the new DSI value with the transmission power limit associated with the current DSI value. The RAT controller 306 may determine to change the transmission power limit only if the transmission power limit associated with the new DSI value and the transmission power limit of the current DSI value are different. Otherwise the RAT controller 306 may not effectuate any change. In one aspect, this may allow a reduction in processing required, for example for initialization procedures, when a change in transmission power level is needed.

According to some implementations, a power detector, such as a high power detector (HDET) (which may be in one or more of the components of FIG. 3) may be used by the system in order to correct for errors caused by the difference between a digital value for a power transmission level and the actual physical value being transmitted. For example, a RAT may specify a transmission power limit of 24 dBm. Once the transmission power level gets above a certain threshold, a power detector is activated which measures the actual power being transmitted by an access terminal 106. The captured value is provided as feedback to the RAT controller 306 so that the actual value and digital value can be compared and the difference can be compensated for. For example, while the digital transmission power limit may be set at 24 dBm, the actual transmission power level may be only 22 dBm. Accordingly, the digital limit may be increased to account for the 2 dBm error to 26 dBm so that the actual transmission better reflects the desired limit. However, the power detector may only be configured to be used to aid in detecting an error when the transmission power limit is above a certain threshold. The power detector may further be used in conjunction with the transmission power limits specified by the LUTs described above. In one implementation, if the transmission power limit from a LUT is within a range normally used or supported by the power detector associated with a RAT type, then the power detector may be activated and used to track and correct the transmission power level. Conversely, if the transmission power limit from a LUT is not within the range, then the power detector may be disabled.

In addition to using a power detector to compensate for differences between digital and actual values of power transmission levels, temperature compensation may also, be performed to correct for actual versus digital differences. Temperature compensation is directed to adjusting the digital gain representation of a transmission power level over different temperatures so that the actual transmission power level remains constant over different temperatures. For devices with a single fixed transmission power limit for achieving SAR compliance, as described above, a single table corresponding temperature adjustments for one or more of a narrow range of transmission power limits is provided, based on an assumption that the transmission power limit is fairly static/constant.

However, according to the implementations described herein, a variable number of transmission power limits are provided according to each operating mode. In order to provide temperature compensation, one implementation provides for multiple tables which include temperature compensation adjustment values for a wide range of transmission power limit values. For example, each table may contain a variable number of temperatures (and accompanying adjustments) corresponding to a narrow range of transmission power limit values. Multiple tables covering a wider range of transmission power limit values may therefore provide for temperature compensations over the possible transmission power limit values specified. In one implementation, the transmission power limit corresponding to a DSI value may be retrieved and then used by a temperature compensation table to determine an adjustment of the transmission power limit according to the temperature. In another implementation, temperature may be included as additional column in the table described above with reference to FIG. 8 such that the transmission power limit adjusted for temperature for each of the rows of FIG. 8 may be retrieved using a current temperature measurement. In addition, similar concepts with respect to frequency compensation may also be provided.

Furthermore, some RATs may not support an exact concept of a transmission power limit. For example, a RAT using the GERAN standard (GSM Edge Radio Access Network) may support the concept of a maximum power level rather than a transmission power limit. In this case, the transmission power limit may refer to the maximum power level. As described above, the power level retrieved by the LUT may be capped in order not to exceed other maximum power level threshold corresponding to the RAT type.

Additionally, some RAT types may ration a transmission power limit across multiple carriers. According to one implementation, a transmission power limit value retrieved by the LUT may represent the aggregate transmission power for all carriers. Transmission power may be allocated among the carriers to satisfy the transmission power limit. Furthermore, for each RAT, additional operations may be performed in order to ensure that a determined transmission power limit is satisfied. Further, it may be desirable to limit the use of the DSI to perform back-offs from power limits according to an operating mode to avoid invoking power transmission back-offs during minimum performance tests.

Radio access technologies (RATs) may support simultaneously transmitting signaling and data using multiple transmitters and/or antennas. For example, an access terminal 106 may be configured to use a simultaneous voice and data mode (e.g., SVDO or SVLTE) where a first transmitter 332 (or antenna 336) may be used to transmit voice data (e.g., 1x data such as voice data) while a second transmitter 342 (or antenna 346) may be used to transmit non-voice data (e.g., DO/EV-DO). As described above, FIG. 3 shows an example of a first transceiver 330 including a first transmitter 332 and a second transceiver 340 including a second transmitter 342. While the description below describes transmissions in the context of two transmitters 332 and 340, it should be appreciated that an access terminal 106 may accomplish simultaneous transmission of various data types with a single or multiple transmitters on separate or shared antennas.

To achieve SAR compliance, the combined contribution of transmissions of both transmitters 332 and 342 to the specific absorption rate may need to be maintained below regulatory limits. The orientation and location of each transmitter 332 and 342 along with any associated antennas 336 or 346 within the device may determine the effect of each transmitter and/or antenna to the specific absorption rate with respect to the other transmitters or antennas. In some access terminal 106 configurations, the transmitters 332 and 342 may be spatially located within the access terminal 106 (e.g., on opposite sides of the access terminal 106) such that simultaneous transmission does not increase the overall specific absorption rate as compared to when just one antenna is transmitting. However, if the transmitters 332 and 342 are located closely together within an access terminal 106, simultaneous transmission may increase the overall specific absorption rate resulting from the access terminal 106. In this case, the access terminal 106 may be configured to account for the power transmission levels of both transmitters 332 and 342 and limit the transmission power levels of each transmitter 332 and 342 based on the power transmission level of the other. Furthermore, if additional antennas or transmitters (not shown) are also included in the access terminal 106 and which are in close proximity to transmitters 332 and 342, then the power transmission level of the three or more transmitters/antennas may be configured such that the overall contribution to the specific absorption rate is within regulatory limits.

An access terminal 106 may therefore be configured to dynamically adjust transmission power limits for multiple transmitters or antennas according to the various operating modes and any combinations thereof similarly as described above. To provide the adjustments, in one implementation, an access terminal 106 may provide a determined number of pre-configured transmission power limits corresponding to various operating modes for each transmitter 332 or 342. The power transmission levels for each type of transmission transmitted on multiple transmitters 332 and 342 may be stored in look-up tables (LUTs) associated with various communication characteristics which may be indexed by a device state index (DSI) corresponding to various operating modes as will be further described below.

In one implementation, the transmission power limit for a second transmitter 342 (or antenna 336) may depend on the transmission power level of a first transmitter 332 based on a priority of information being sent by the transmitter. For example, a first transmitter 332 may be used for transmitting voice data (e.g., 1x data) while a second transmitter 342 may be used for transmitting non-voice data (e.g., data only (DO) EV-DO or DO/LTE). It may useful to ensure that the transmission power used to transmit voice data on the first transmitter 332 is not sacrificed for transmitting non-voice data over a second transmitter 342. As such, one implementation provides for imposing power transmission limits on the second transmitter 342 based on the current transmission power level of the first transmitter 332. In this case, there may be no power limit adjustment (or back-off) associated with the first transmitter 332 (e.g., the transmitter used to transmit the higher priority information). The transmission power limit for the second transmitter 342 may be set such that the SAR contribution from the second transmitter 342 at this limit is equal to the difference between the maximum SAR, or target SAR, allowed for the access terminal 106, and the current SAR contribution from the first transmitter 332 based on the current transmission power level of the first transmitter 332. The total allowed transmission power for ensuring SAR compliance may change based on various operating modes as described above. As such, the access terminal 106 may be configured to dynamically adjust the power transmission limit for the second transmitter 342 based on both a detected operating mode and a power transmission level of a first transmitter 332 sending high priority information when both transmitters 332 and 342 are transmitting simultaneously.

Figure 13:
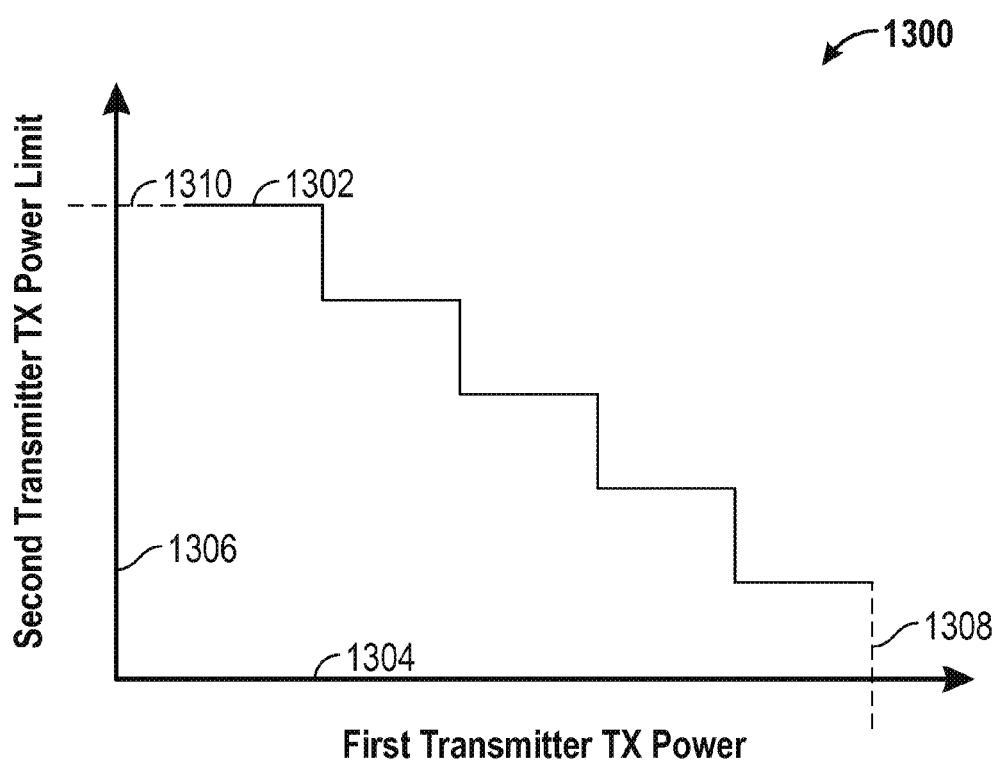
FIG. 13 shows a graph illustrating how a transmission power limit for lower priority data that may be transmitted using a second transmitter may be adjusted as a function of the transmission power level for higher priority data that may be transmitted using a first transmitter.

FIG. 13 shows a graph 1300 illustrating how a transmission power limit for lower priority data (e.g., data only such as DO/LTE) that may be transmitted using a second transmitter 342 may be adjusted as a function of the transmission power level for higher priority data (e.g., voice data) that may be transmitted using a first transmitter 332. As the transmission power for the first transmitter 332 (represented as the x-axis 1304) increases, the transmission power limit applied to the second transmitter 342 (represented by the y-axis 1306) decreases as shown by the transmission power limit curve 1302. In this case, the transmission power for the first transmitter 332 may increase unless it is either above the maximum power transmission level allowed by the RAT (shown by 1308) or if it is transmitting power at a level on its own above SAR limits. The transmission power limit for the second transmitter 342 (or lower priority data) may be set such that the SAR contribution from the second transmitter 342 at this limit is equal to the difference between the maximum SAR, or target SAR, allowed for the access terminal, and the current SAR contribution from the first transmitter 332 based on the current transmission power level of the first transmitter 332. While the transmission power limit curve 1302 for the second transmitter 342 as a function of the transmission power level of the first transmitter 332 is shown as a step function in FIG. 13 according to implementations as will be further described below, implementations may also make use of various linear or non-linear functions for adjusting the transmission power limit for the second transmitter 342.

Different operating modes described above may adjust the SAR and therefore the total available transmission power available for staying below regulatory limits as described above. The access terminal 106 may be configured to dynamically adjust a function or relationship defining the transmission power limit to be applied to the second transmitter 342 (e.g., such as the function shown in FIG. 13) based on a current operating mode. For example, per device state index (DSI) described above, a different function defined for adjusting the transmission power limit for a second transmitter 342 as compared to the current transmission power level of a first transmitter 332 may be defined. Any type of linear or non-linear function may be used for each DSI. For example, if Wi-Fi for an access terminal 106 is enabled, or a proximity sensor 350 is triggered, the SAR may increase. If this is detected, then the function defining the transmission power limits for a second transmitter 342 may be adjusted (e.g., corresponding to the transmission power limit curve 1302 moving downward) for each range of current transmission power level of a first transmitter 332 via a transformation. This may allow for dynamically accounting for the additional SAR contribution according to the operating mode while avoiding limiting any power for the first transmitter 332. If the second transmitter 342 power transmission level is at a minimum, then the transmission power level for the first transmitter 332 may also be limited according to detected operating conditions (e.g., Wi-Fi or hotspot) that increases or decreases the SAR.

According to one implementation, a look up table (LUT) may be used to define transmission power limits for data on a second transmitter 342 based on transmission power levels for data on a first transmitter 332. The values in the LUT may define a function/relationship as shown in FIG. 13. FIG. 14A shows an example of a LUT 1400 that may be used to determine a power transmission limit for a second transmitter 342 based on the current power transmission level of a first transmitter 332. The first column of the LUT 1400 provides various power transmission levels for a first transmitter 332. The choices of values for the first column may allow for controlling or limiting the transmission power level for the first transmitter 332. The second column indicates a transmission power limit for a second transmitter 342 based on the power transmission level of the first transmitter 332. In FIG. 14A, the transmission power levels for the first transmitter 332 shown in the first column may increase for each subsequent row. As the transmission power levels for the first transmitter 332 increase for each row, the transmission power limits of the second transmitter 342 shown in the second column may decrease for each subsequent row. Accordingly, as the transmission power level increases for the first transmitter 332, the transmission power limit for the second transmitter 342 decreases. To provide for dynamic adjustment of transmission power levels based on operating conditions, a different LUT 1400 may be provided for any number of device state indexes (DSI), where each DSI corresponds to a different operating condition or mode or combination thereof. The LUT 1400 shown in FIG. 14A shows five different transmission power levels for a first transmitter 332; however, any number of different transmission power levels may be used. The values in each row may be stored, for example as signed, 16-bit integers with the lowest significant bit representing 1/10 dBm.

FIG. 14B shows a table 1402 that illustrates how the LUT 1400 may be used to determine the transmission power limit for a second transmitter 342 based on the current transmission power level of a first transmitter 332. The transmission power level for a first transmitter 332 may be sampled at various time intervals (e.g., for every power control group (PCG) or at every 1.25 ms) and filtered to provide continual measurements. In one implementation, a processor 320 associated with a first transmitter 332 (or processor 320 configured to handle a class of data being sent using a first transmitter) may perform the sampling and measurements. This data may be communicated to another processor 320 associated with the second transmitter 342 (or a processor 320 configured to handle a class of data being sent using a second transmitter 342). As such, an indication of a DSI may be sent to both processors. In other implementations, any combination of processor 320 or processors may be configured to perform the sampling and adjustment for the power transmission limits for each transmitter and/or antenna. Each time transmission power levels are adjusted, the current transmission power level is compared against the transmission power levels defined in the LUT 1400. If the transmission power level is below the first level in the first row shown in FIG. 14A, a default transmission power limit for the second transmitter 342 may be applied. If the current transmission power level for the first transmitter 332 is between the first and second levels as defined by the LUT 1402, then the associated transmission power limit for the second transmitter 342 associated with the first transmission power level of the first transmitter 332 may be applied. Thereafter, if the current transmission power level for the first transmitter 332 is between the second and third levels as defined by the LUT 1402, then the associated transmission power limit for the second transmitter 342 associated with the second transmission power level may be applied and so on.

Figure 15:
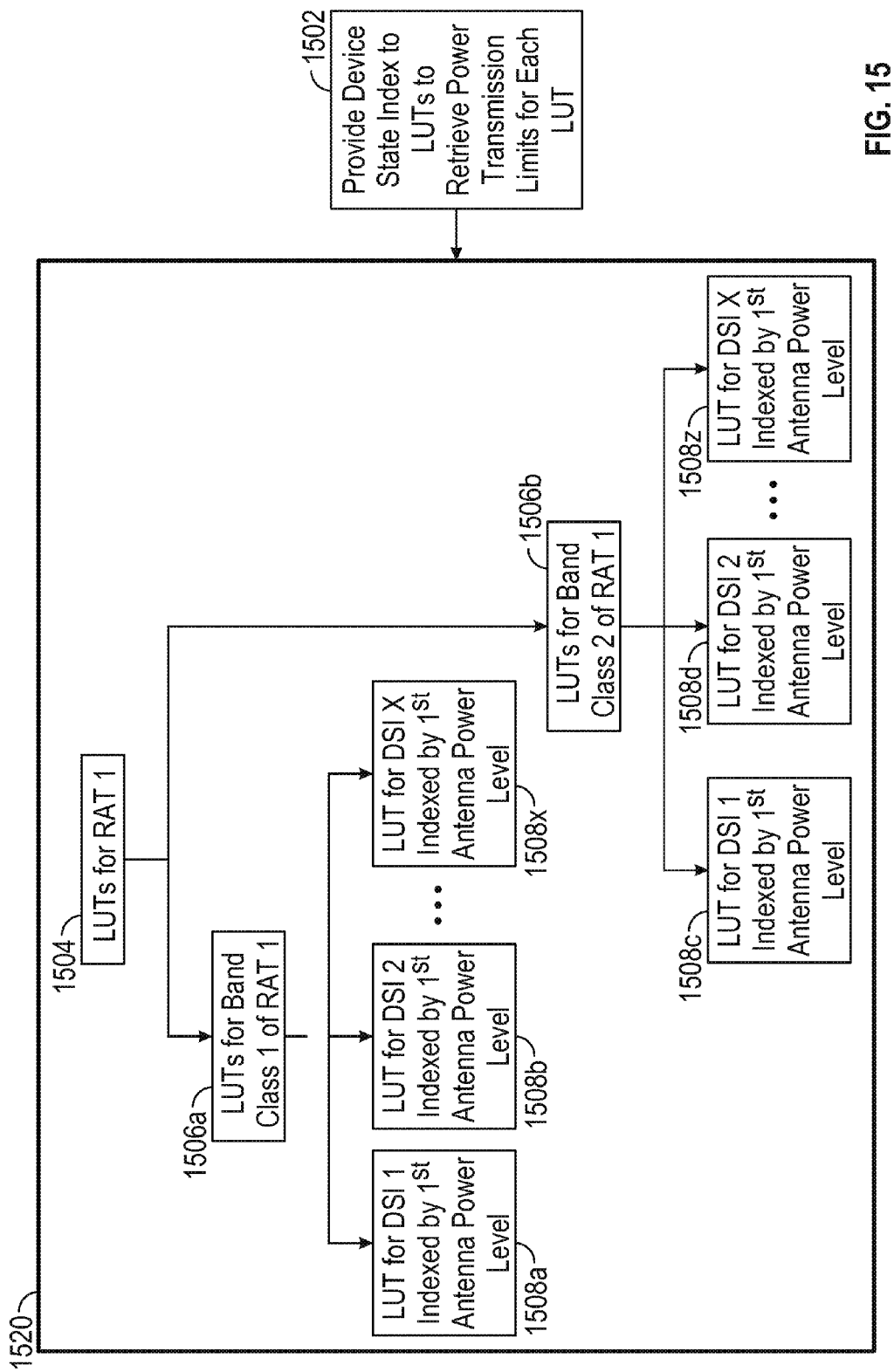
FIG. 15 shows an example of different groups of look up tables for a radio access technology type which allows for dynamically determining a power transmission limit per a detected device state index for simultaneous transmission modes.

The access terminal 106 may provision a different LUT 1400 for each DSI to allow providing limits on the transmission power levels for a second transmitter 342 according to different operating modes or conditions. The LUT 1400 for each DSI may be provided for each band-class per RAT or additional characteristics and combinations as described above. FIG. 15 shows an example of different groups of LUTs for a RAT type which allows for dynamically determining a power transmission limit per a detected DSI for simultaneous transmission modes. In block 1502, a device state index (DSI) is provided to a RAT controller 306 for determining transmission power level limits. In block 1520, a group of LUTs 1504 is shown which defines power transmission levels associated with a RAT. For example, a group of LUTs 1504 may be provisioned for both SVDO and SVLTE. A group of LUTs for each band-class of the RAT is further provided as shown in blocks 1506a and 1506b. For example a group of LUTs may be provided for at least two band-classes for 1x/EV-DO, for at least two band-classes of DO/EV-DO or for band-classes of LTE. For each band-class, a different LUT 1508a, 1508b through 1508x and 1508c, 1508d through 1508z is provided as described in FIG. 14A for each DSI value. Based on the measured transmission power level of the first transmitter 332, the LUTs 1508a, 1508b through 1508x and 1508c, 1508d through 1508z may provide a power transmission limit for a second transmitter 342 according to the DSI. While shown as LUTs for each band-class, the LUTs 1508a, 1508b through 1508x and 1508c, 1508d through 1508z may be further provisioned for different combinations of channels of a band-class or other sub-combinations as described above, for example with reference to FIG. 6.

By providing a different LUT 1400 for each DSI per configuration per band class per RAT, etc., each different LUT 1400 may provide flexibility in defining exactly how the transmission power limit for the second transmitter 342 is chosen based on the transmission power level for the first transmitter 332. In other words, a different function describing the transmission power limit for the second transmitter 342 based on the transmission power level for the first transmitter 332 may be provided by every LUT. This allows for complex changes to the transmission power limit curve 1302 for each DSI. Memory requirements for storing each LUT 1400 for each DSI according to the combinations described above may be significant. Furthermore, in some cases, provisioning each LUT may be time consuming or cumbersome. Space/memory requirements may not scale well if additional DSIs or RATs are added.

In another implementation, the number of LUTs 1400 may be reduced by providing a standard function or relationship for determining the power transmission limit for a second transmitter 342 based on the transmission power level of a first transmitter 332 along with the ability to apply transformations to the function for each operating mode or condition defined by a DSI.

Figure 16:
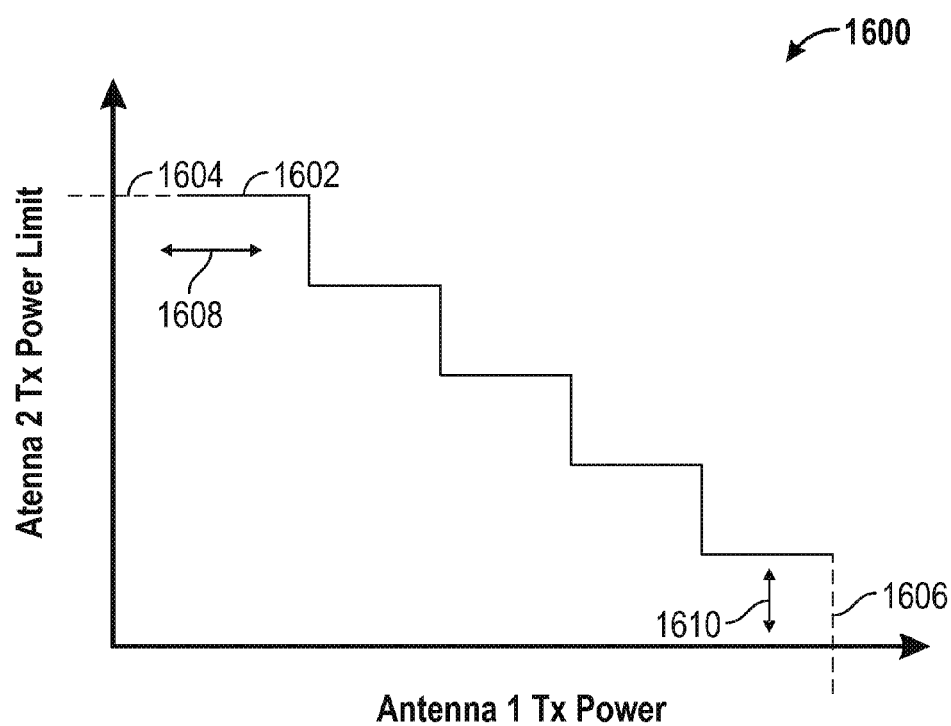
FIG. 16 shows a graph similar to the graph shown in FIG. 13 illustrating an example of transformations that may be applied to a standard transmission power limit curve.

FIG. 16 shows a graph 1600 similar to the graph 1300 shown in FIG. 13 illustrating an example of transformations that may be applied to a standard transmission power limit curve 1602. In FIG. 16, a standard transmission power limit curve 1602 may be shifted up or down as shown by the arrows 1610. Configuring the access terminal 106 to adjust the transmission power limit curve 1602 (representing how the transmission power limit for the second transmitter 342 is determined based on the power transmission level of the first transmitter 332) up or down allows the amount of transmission power limit applied to the second transmitter 342 to be increased or decreased relative to all transmission power levels of the first transmitter 332. An additional transformation shown by the arrows 1608 allows for shifting the transmission power limit curve 1602 left or right. This transformation allows adjusting the power transmission levels of the first transmitter 332 that correspond to various limits on the transmission power of the second transmitter 342. Each DSI may use a different transformation of either left or right or up or down. Furthermore, other types of transformations may also be configured with respect to the standard transmission power limit curve 1602. For example a transformation could provide an angle which would allow for rotating the transmission power limit curve 1602 around a fixed point to further configure how to determine the power transmission power limit for the second transmitter 342 with respect to a standard function.

According to one implementation, a look up table (LUT) may be used to define the standard set of transmission power limits for data on a second transmitter 342 according to transmission power limits for data on a first transmitter 332 (i.e., the standard function described above). The values in the LUT may define a function as shown in FIG. 16 which allows transformations along either the x or y-axis. In other implementations a LUT may define additional transformations to a standard function/relationship. FIG. 17A shows an example of a look up table (LUT) 1700 defining a standard set of transmission power limits for data on a second transmitter 342 according to transmission power limits for data on a first transmitter 332 with the ability to adjust the standard values according to a transformation. The first column of the LUT 1700 provides various power transmission levels for a first transmitter 332 as well as an added bias input that corresponds to a DSI. The second column indicates a transmission power limit for a second transmitter 342 based on the power transmission level of the first transmitter 332 as well as an added bias output that corresponds to a DSI. In FIG. 17A, the transmission power levels for the first transmitter 332 shown in the first column may increase for each subsequent row. As the transmission power levels increase for the first transmitter 332 increase for each row, the transmission power limit of the second transmitter 342 shown in the second column may decrease for each subsequent row. Accordingly, as the transmission power level increases for the first transmitter 332, the transmission power limit for the second transmitter 342 decreases. The bias values to be applied to the LUT 1700 may be obtained from another LUT which may be indexed by a DSI.

FIG. 17B shows an example of a LUT 1702 that may be used to determine the amount of bias to be applied for each DSI to the LUT 1700 of FIG. 17A. In FIG. 17B, each DSI is associated with an input bias corresponding to an amount to be added to the transmission power level of the first transmitter 332 shown in FIG. 17A and an output bias corresponding to an amount to be added to the transmission power limit of the second transmitter 342 shown in FIG. 17A. The bias values may be positive or negative. In addition, a DSI of zero corresponding to a default operating mode may also be provided which does not provide for additional bias. When a new DSI is provided from the processor 320, the input and output biases may be determined from the LUT 1702 in FIG. 17B and then applied to the LUT 1700 of FIG. 17A. The transmission power limit is then determined by using a measured transmission power level of the first transmitter 332 as described above with reference to FIG. 15B and then by further using the bias values to adjust the overall function defined by the LUT 1700. As such, the LUT 1702 may define a transformation of a relationship defined by a LUT 1700.

Figure 18:
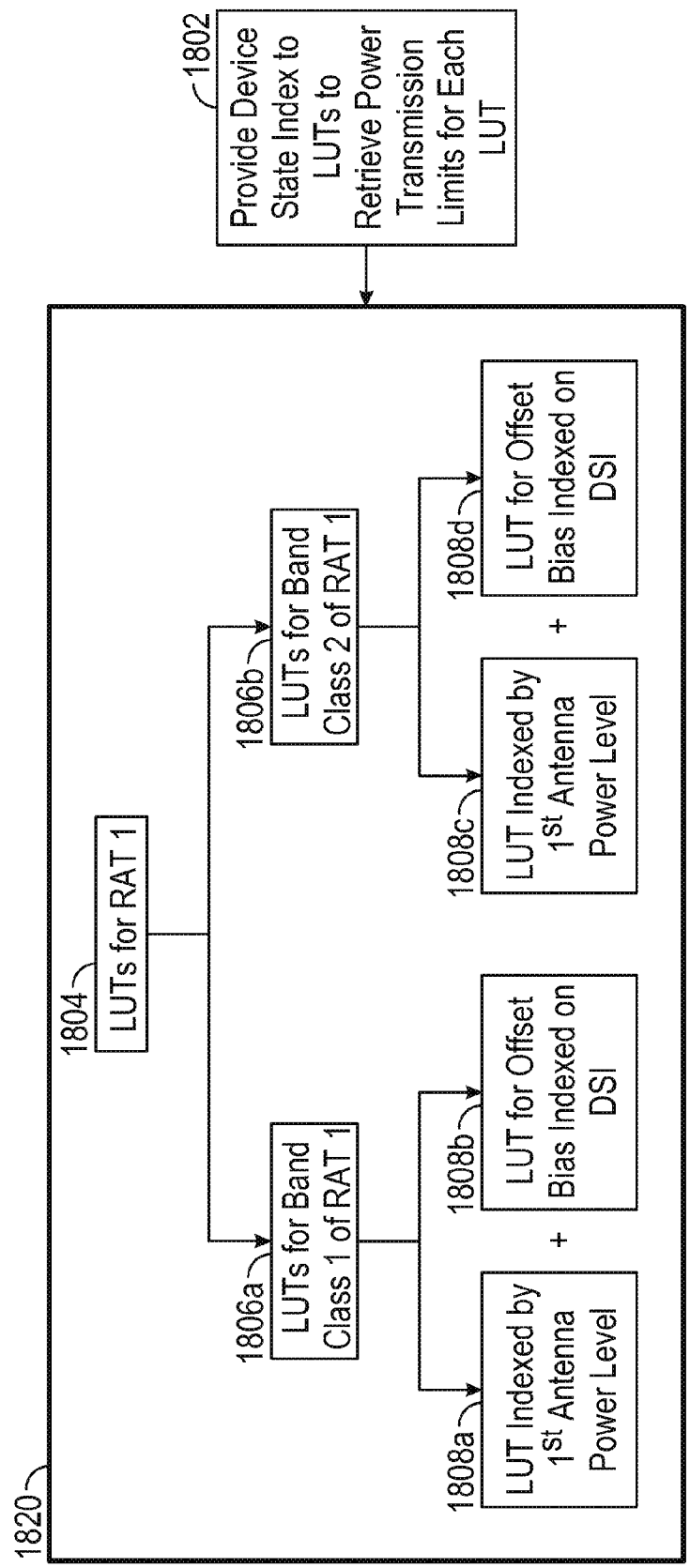
FIG. 18 shows an example of different groups of look up tables for a radio access technology type which allows for dynamically determining a power transmission limit per a detected device state index for simultaneous transmission modes.

Accordingly, rather than have a separate LUT 1400 for each DSI, two LUTs 1700 and 1702 are provided to define a standard function and bias values for transforming the standard function. This may allow for provisioning less LUTs per configuration/band-class for each RAT etc. FIG. 18 shows an example of different groups of LUTs for a RAT type which allows for dynamically determining a power transmission limit per a detected DSI for simultaneous transmission modes. In contrast to FIG. 15, for each band-class, two LUTs 1708a and 1708b and 1708c and 1708d are provided for each band-class. While shown as LUTs for each band-class, the LUTs 1708a and 1708b and 1708c and 1708d may be further provisioned for different combinations of channels of a band-class or other sub-combinations as described above, for example with reference to FIG. 6. This allows for two LUTs per configuration for simultaneous transmission as compared to a LUT for each DSI as described above with reference to FIGS. 14A and 15. In one aspect, this may allow for significant storage savings. Other advantages can similarly be envisioned.

Pseudo code is provided below to illustrate how bias values may be applied to a LUT 1700 to determine the transmission power limit.

```
SAR-related LTE Tx power limit = P_PowerClass
Target_LUT_row_num = −1
For i = 0 to 4
        if (filtered 1x Tx power >= (1x_Tx_power[i] + input_bias[DSI]))
                Target_LUT_row_num = i
        end
end
if (Target_LUT_row_num > −1)
        SAR-related LTE Tx power limit is SUM of .....
        SAR-related LTE Tx power limit or LUT Row# =
        Target_LUT_row_num PLUS
        output_bias[DSI]
end
```

In addition, where multiple transmitters are used, multiple tiers of priority may be provided for determining priority and thereby which transmitter's power level is adjusted based on the power level of another transmitter. For example, there may be tiers of priority associated with different RATs. Each tier of priority may support several combinations of transmitter (and bands) and transmit antenna 336 for a corresponding RAT. For example, a first tier of priorities may be associated with one technology. For example, there may be 1 transmitter associated with a first tier and one transmitter associated with a second tier. In another implementation, there may be two transmitters in the first tier and no transmitters associated with the second or third tiers. In another implementation, there may be 1 transmitter in a first tier and 2 transmitters in a second tier. In another implementation, there may be a transmitter for each of a first, second and third tier. Different transformations as described above with reference to FIGS. 13-18 may then be associated with different tiers. The operating mode may further determine the priority tier. As such, each transmitter 332 may be configured to report a time-averaged Tx power. Each transmitter 332 may further be configured to invoke/provisional a LUT to determine the power transmission limit for one transmitter based on the averaged TX power of transmitter that is/are higher in priorities. The table below shows example of the LUTS associated with each tiers.

TABLE 1

| Transmitters in each Tier of Priorities | LUT(s) |
|---|---|
| 1 in 1st tier, 1 in 2nd tier, 0 in 3rd tier | 1-input, 1-output LUT for 2nd tier |
| 2 in 1st tier, 0 in 2nd tier, 0 in 3rd tier | 2 transmitters managed collectively/jointly |
| 1 in 1st tier, 1 in 2nd tier, 1 in 3rd tier | 1-input, 1-output LUT for 2nd tier
1-input, 1-output LUT for 3rd tier |
| 1 in 1st tier, 2 in 2nd tier, 0 in 3rd tier | 1-input, 2-output LUT for 2nd tier |
| 2 in 1st tier, 1 in 2nd tier, 0 in 3rd tier | 2-input, 1-output LUT for 2nd tier |

As such, as described above, dynamic transmission power limit management may be provided for multiple RAT types. For example, implementations described herein may be used in conjunction with RAT types such as 1x, DO, GSM (and EDGE/GPRS), WCDMA/UMTS (and HSPA/HSPA+), LTE (FDD and TDD), TD-SCDMA, WLAN, and the like. Furthermore, as described above with reference to FIGS. 14-18, dynamic transmission power limit may be supported for a variety of concurrent RAT transmissions. For example, concurrent transmissions of 1x+DO, 1x+LTE, 1x WLAN, DO+WLAN, GSM+WLAN, WCDMA/UMTS+WLAN, LTE+WLAN, TD-SCDMA+WLAN, 1x+DO+WLAN, 1x+LTE+WLAN, GSM+LTE, GSM+LTE+WLAN, 1x+GSM, DO+GSM, GSM+GSM, GSM+WCDMA/UMTS, GSM+TD-SCDMA, and the like may be supported. As such, transformations and applicable LUTs for managing transmission power levels of one RAT based on priorities of transmissions for another RAT may be included for each of these combinations.

Figure 19:
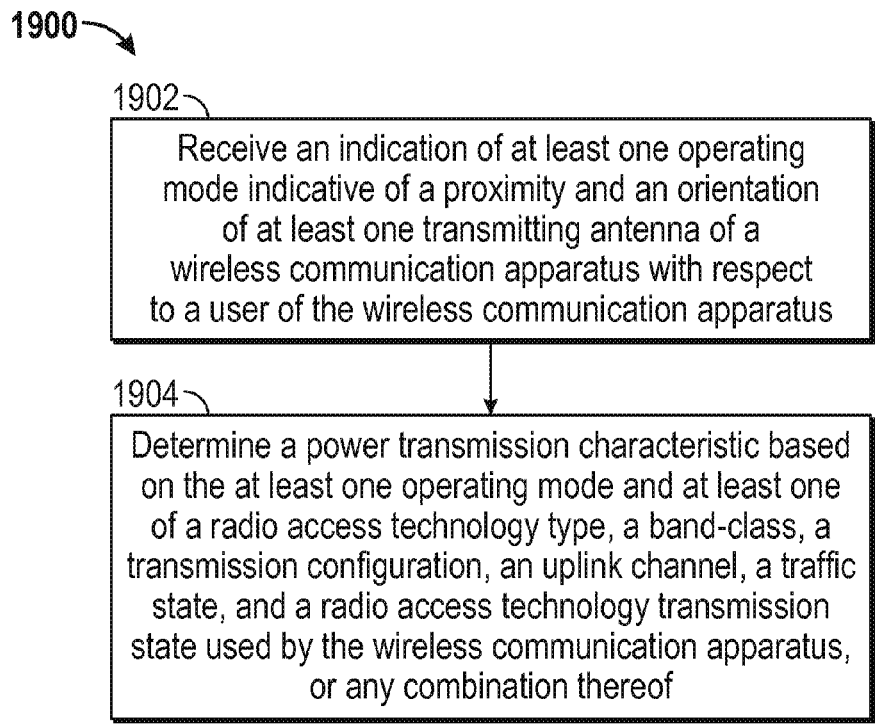
FIG. 19 shows a flowchart of an implementation of an exemplary method implemented by a wireless communication apparatus.

FIG. 19 shows a flowchart of an implementation of an exemplary method 1900 implemented by a wireless communication apparatus. The method 1900 may be implemented at an access terminal 106. Although the method 1900 is described below with respect to elements of the access terminal 106, those having ordinary skill in the art will appreciate that other components may be used to implement one or more of the blocks described herein.

At block 1902, an indication is received of at least one operating mode indicative of a proximity and an orientation of at least one transmitting antenna 336 of a wireless communication apparatus such as an access terminal 106. The indication may be received at a processor 320. In another implementation, the indication may be received at a RAT controller 306. At block 1904, a power transmission characteristic is determined that is based on the at least one operating mode and at least one of a radio access technology type, a band-class, a transmission configuration, an uplink channel, a traffic state, and a radio access technology transmissions state used by the wireless communication apparatus, or any combination thereof. The determining may be performed by a processor 320. In another implementation, the determining may be performed by a RAT controller 306. The power transmission characteristic may be a power limit which specifies the maximum power that may be transmitted or may be a maximum power level transmitted by the application.

Figure 20:
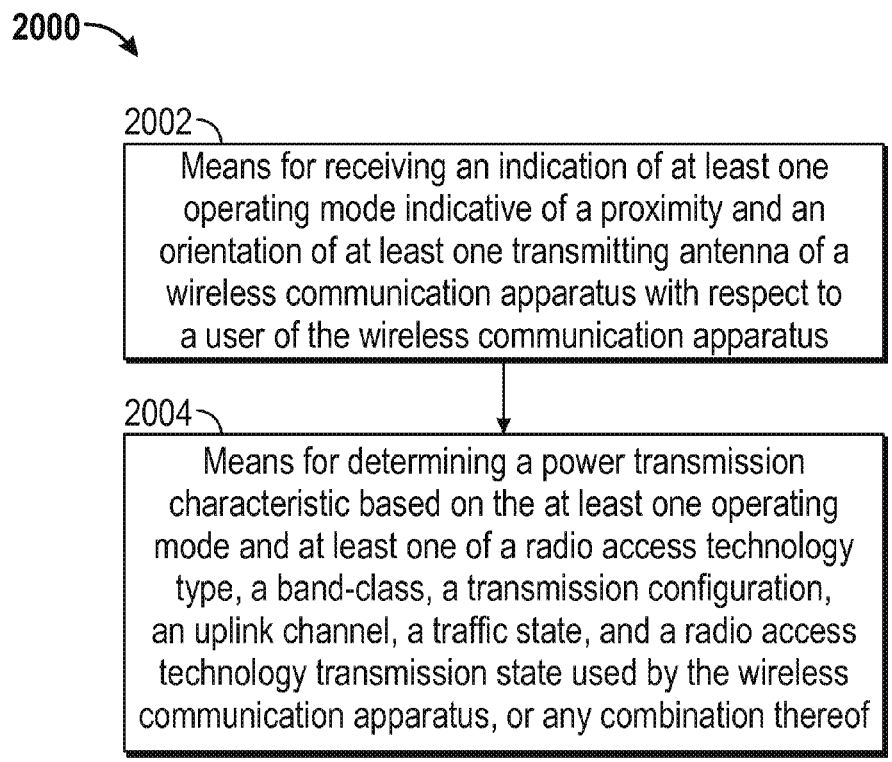
FIG. 20 shows a functional block diagram of an exemplary wireless communication apparatus.

FIG. 20 shows a functional block diagram of an exemplary wireless communication apparatus 2000. Apparatus 2000 comprises means 2002 and 2004 for the various actions discussed with respect to FIGS. 4-19. The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for receiving an indication may include a processor 320 or a RAT controller 306. Means for determining a power transmission characteristic may also include a processor 320 or a RAT controller 306.

Figure 21:
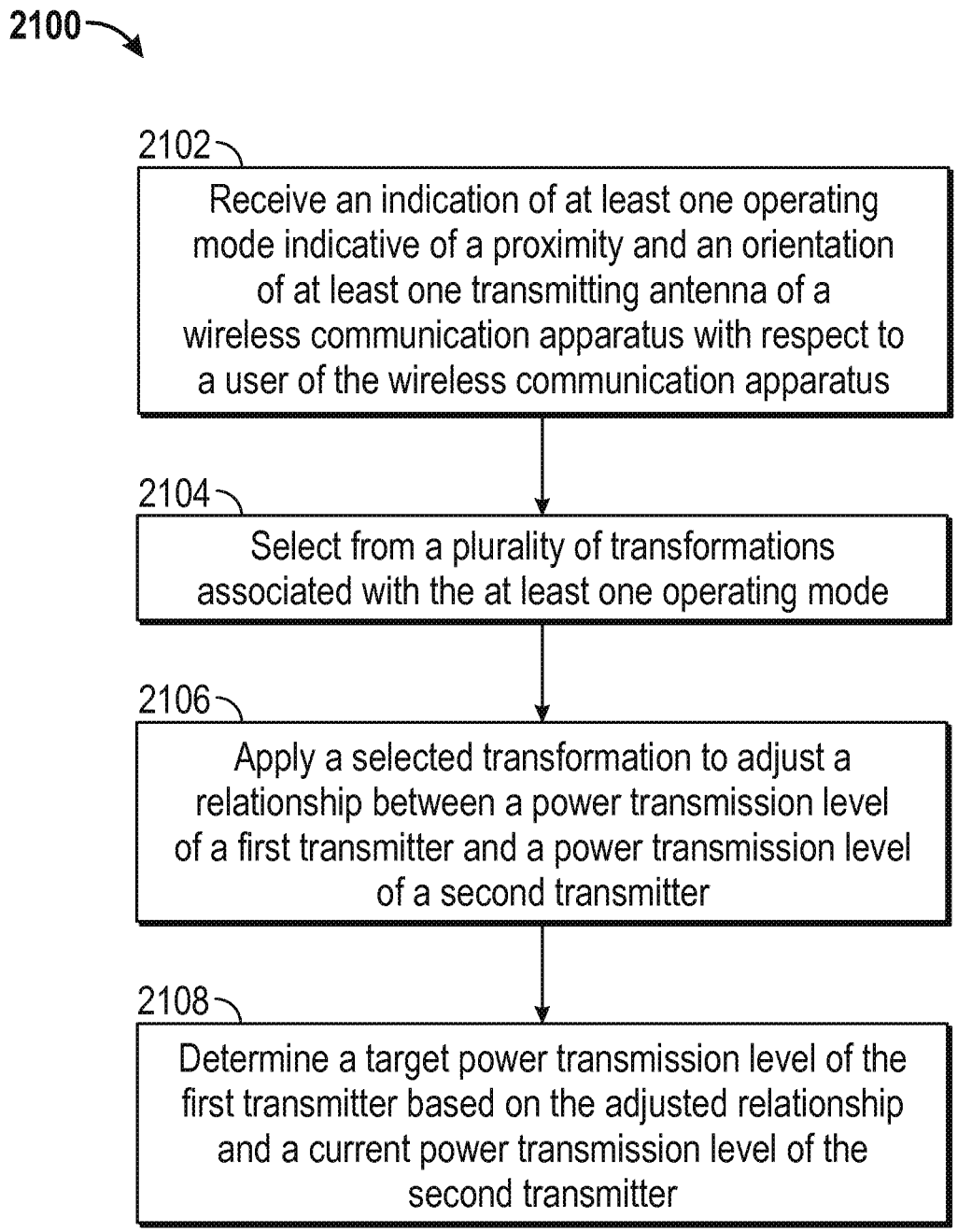
FIG. 21 shows a flowchart of an implementation of another exemplary method implemented by a wireless communication apparatus.

FIG. 21 shows a flowchart of an implementation of another exemplary method 2100 implemented by a wireless communication apparatus. The method 2100 may be implemented at an access terminal 106. Although the method 2100 is described below with respect to elements of the access terminal 106, those having ordinary skill in the art will appreciate that other components may be used to implement one or more of the blocks described herein. At block 2102, an indication is received of at least one operating mode indicative of a proximity and an orientation of at least one transmitting antenna of the wireless communication apparatus such as the access terminal 106. The indication may be received at a processor 320. In another implementation, the indication may be received at a RAT controller 306. At block 2104, one of a plurality of transformations is selected associated with the at least one operating mode. The selection may further be performed by a processor 320 or a RAT controller 306. The transformation may be defined by a LUT 1702 as described above with reference to FIG. 17B. At block 2106, a selected transformation may be applied to adjust a relationship between a power transmission level of a first transmitter 332 and a power transmission level of a second transmitter 334. The transformation may further be applied by a processor 320 or a RAT controller 306. The relationship may be defined by a LUT 1700, for example, as described above with reference to FIG. 17A. At block 2108 a target power transmission level of the first transmitter 332 may be determined based on the adjusted relationship and a current power transmission level of the second transmitter 342. The determining may further be performed by a processor 320 or a RAT controller 306.

Figure 22:
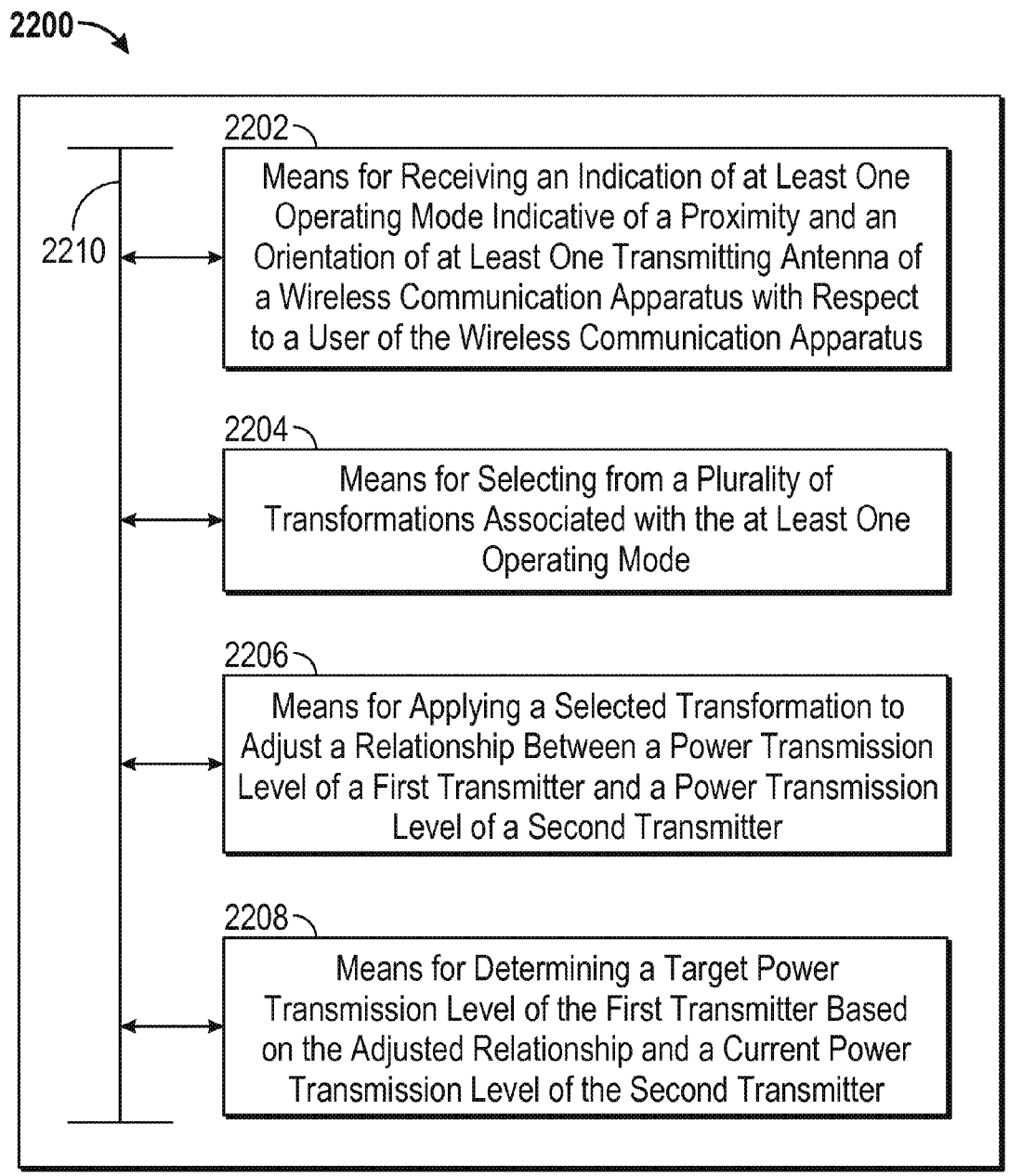
FIG. 22 shows another example of a functional block diagram of a wireless communication apparatus.

FIG. 22 illustrates a functional block diagram of a wireless communication apparatus 2200. Device 2200 comprises means 2202, 2204, 2206, and 2208 for the various actions discussed with respect to FIGS. 4-21 that may send signals and communicate via a communication line 2210 (or bus). The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for receiving an indication, means for selecting, means for applying, and means for determining may be performed by one of a processor 320 or a RAT controller 306.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Figure 23:
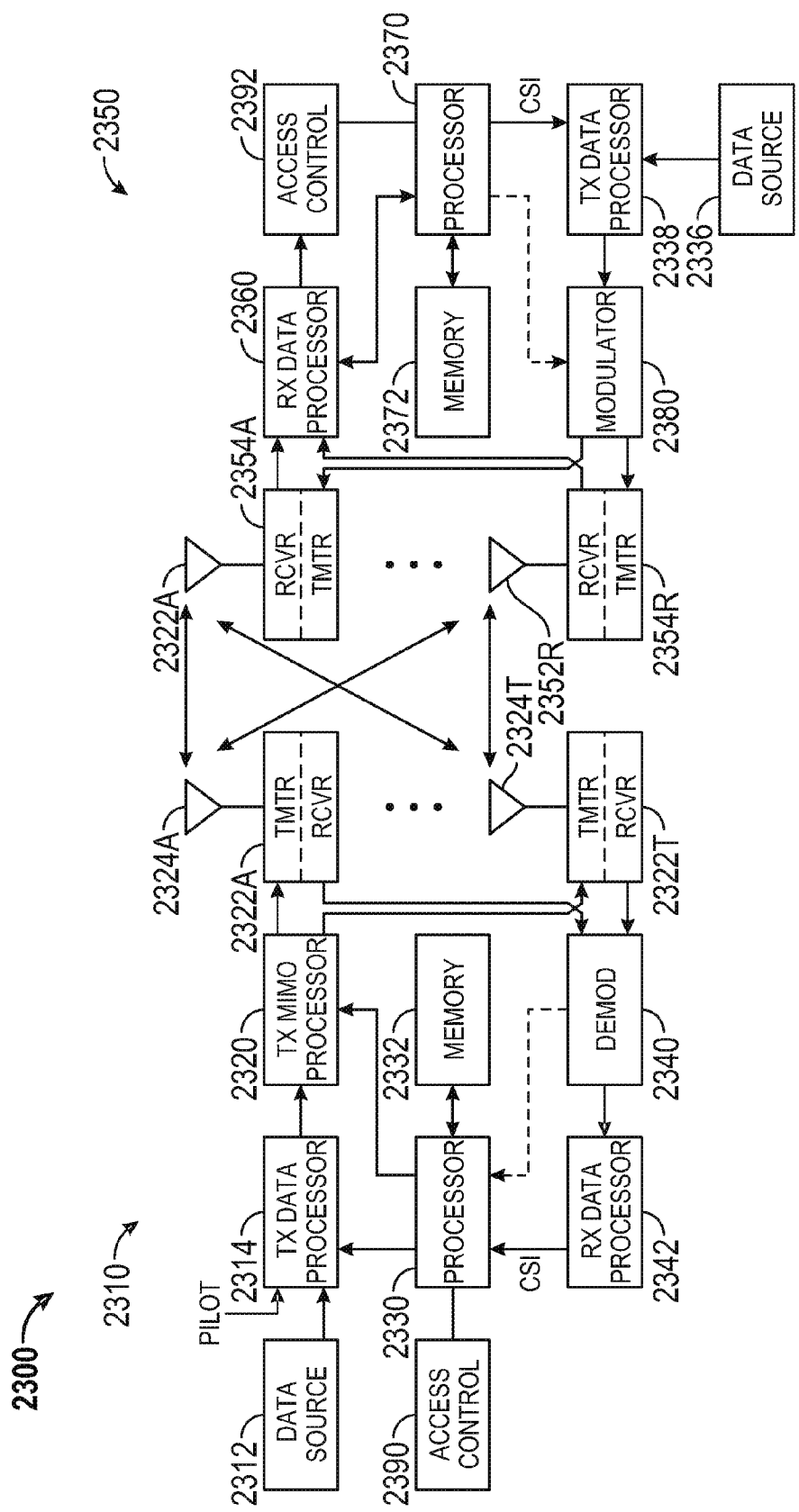
FIG. 23 shows an example of a functional block diagram of various components in a communication system.

Furthermore, as indicated by the systems and methods described above, the teachings herein may be incorporated into a node (e.g., a device) employing various components for communicating with at least one other node. FIG. 23 depicts several sample components that may be employed to facilitate communication between nodes. Specifically, FIG. 23 is a simplified block diagram of a first wireless device 2310 (e.g., an access point) and a second wireless device 2350 (e.g., an access terminal) of a multiple-in-multiple-out (MIMO) system 2300. At the first device 2310, traffic data for a number of data streams is provided from a data source 2312 to a transmit (TX) data processor 2314.

In some aspects, each data stream is transmitted over a respective transmit antenna. The TX data processor 2314 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 2330. A data memory 2332 may store program code, data, and other information used by the processor 2330 or other components of the device 2310.

The modulation symbols for all data streams are then provided to a TX MIMO processor 2320, which may further process the modulation symbols (e.g., for OFDM). The TX MIMO processor 2320 then provides $N_T$ modulation symbol streams to $N_T$ transceivers (XCVR) 2322A through 2322T. In some aspects, the TX MIMO processor 2320 applies beam-forming weights to the symbols of the data streams and to the antenna from which the symbol is being transmitted.

Each transceiver 2322 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transceivers 2322A through 2322T are then transmitted from $N_T$ antennas 2324A through 2324T, respectively.

At the second device 2350, the transmitted modulated signals are received by $N_R$ antennas 2352A through 2352R and the received signal from each antenna 2352 is provided to a respective transceiver (XCVR) 2354A through 2354R. Each transceiver 2354 conditions (e.g., filters, amplifies, and down converts) a respective received signal, digitizes the conditioned signal to provide samples, and further processes the samples to provide a corresponding "received" symbol stream.

A receive (RX) data processor 2360 then receives and processes the $N_R$ received symbol streams from $N_R$ transceivers 2354 based on a particular receiver processing technique to provide $N_T$ "detected" symbol streams. The RX data processor 2360 then demodulates, deinterleaves, and decodes each detected symbol stream to recover the traffic data for the data stream. The processing by the RX data processor 2360 is complementary to that performed by the TX MIMO processor 2320 and the TX data processor 2314 at the device 2310.

A processor 2370 periodically determines which pre-coding matrix to use (discussed below). The processor 2370 formulates a reverse link message comprising a matrix index portion and a rank value portion. A data memory 2372 may store program code, data, and other information used by the processor 2370 or other components of the second device 2350.

The reverse link message may comprise various types of information regarding the communication link and/or the received data stream. The reverse link message is then processed by a TX data processor 2338, which also receives traffic data for a number of data streams from a data source 2336, modulated by a modulator 2380, conditioned by the transceivers 2354A through 2354R, and transmitted back to the device 2310.

At the device 2310, the modulated signals from the second device 2350 are received by the antennas 2324, conditioned by the transceivers 2322, demodulated by a demodulator (DEMOD) 2340, and processed by a RX data processor 2342 to extract the reverse link message transmitted by the second device 2350. The processor 2330 then determines which pre-coding matrix to use for determining the beam-forming weights then processes the extracted message.

FIG. 23 also illustrates that the communication components may include one or more components that perform access control operations as taught herein. For example, an access control component 2390 may cooperate with the processor 2330 and/or other components of the device 2310 to send/receive signals to/from another device (e.g., device 2350) as taught herein. Similarly, an access control component 2392 may cooperate with the processor 2370 and/or other components of the device 2350 to send/receive signals to/from another device (e.g., device 2310). It should be appreciated that for each device 2310 and 2350 the functionality of two or more of the described components may be provided by a single component. For example, a single processing component may provide the functionality of the access control component 2390 and the processor 2330 and a single processing component may provide the functionality of the access control component 2392 and the processor 2370. Furthermore, the components of the apparatus 2300 described with reference to FIG. 3 may be incorporated with/into the components of FIG. 23.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-23 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method implemented in a wireless communication apparatus, comprising:
   receiving an indication of at least one operating mode indicative of a proximity and an orientation of at least one transmitting antenna of the wireless communication apparatus; and
   determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein determining the power transmission characteristic includes determining a minimum between a maximum power transmission characteristic supported by the radio access technology type and a second power transmission characteristic determined by the at least one operating mode.

2. A method implemented in a wireless communication apparatus, comprising:
   receiving an indication of at least one operating mode indicative of a proximity and an orientation of at least one transmitting antenna of the wireless communication apparatus; and
   determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the at least one operating mode is further indicative of at least one of a mobile hotspot being activated and an E911 (Enhanced 9-1-1) callback mode being triggered, or any combination thereof.

3. The method of claim 1, wherein the transmission power characteristic is determined so that the at least one transmitting antenna does not exceed a specific absorption rate (SAR) threshold.

4. A method implemented in a wireless communication apparatus, comprising:
   determining an operating mode of the wireless communication apparatus based on a determined criteria, wherein the determined criteria includes a duration of time of the wireless communication apparatus operating in a previous operating mode;
   receiving an indication of at least one operating mode indicative of a proximity and an orientation of at least one transmitting antenna of the wireless communication apparatus; and
   determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof.

5. The method of claim 1, wherein determining a power transmission characteristic is further based on at least one of a type of call and a temperature of the wireless communication apparatus.

6. A method implemented in a wireless communication apparatus, comprising:
   receiving an indication of at least one operating mode indicative of a proximity and an orientation of at least one transmitting antenna of the wireless communication apparatus; and
   determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein determining a power transmission characteristic is further based on at least one of a type of call and a temperature of the wireless communication apparatus, and wherein the type of call is a call to an emergency operator.

7. A method implemented in a wireless communication apparatus, comprising:
   receiving an indication of at least one operating mode indicative of a proximity and an orientation of at least one transmitting antenna of the wireless communication; and
   determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein determining a power transmission characteristic comprises:
   mapping the at least one operating mode to a determined value; and
   providing the determined value to a look-up table associated with the radio access technology type, the look-up table configured to provide the power transmission characteristic based on the determined value.

8. The method of claim 1, wherein the power transmission characteristic includes at least one of a power transmission limit and a maximum power level.

9. The method of claim 1, wherein the radio access technology type corresponds to at least one of a wireless wide area network, a wireless local area network, a wireless network for sending voice communications, a wireless network for sending data communications, or any combination thereof.

10. A method implemented in a wireless communication apparatus, comprising:
    receiving an indication of at least one operating mode indicative of a proximity and an orientation of at least one transmitting antenna of the wireless communication apparatus;
    determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof; and
    adjusting at least one power transmission level based on the determined power transmission characteristic, wherein the at least one power transmission level is adjusted based on a determination that the determined transmission power characteristic is different than a power characteristic previously used.

11. A wireless communication apparatus comprising: at least one transmitting antenna; and
    a processor configured to:
    receive an indication of at least one operating mode indicative of a proximity and an orientation of a transmitting antenna: and
    determine a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the processor is further configured to determine the power transmission characteristic by determining a minimum between a maximum power transmission characteristic supported by the radio access technology type and a second power transmission characteristic determined by the at least one operating mode.

12. A wireless communication apparatus comprising:
    at least one transmitting antenna; and
    a processor configured to:
    receive an indication of at least one operating mode indicative of a proximity and an orientation of a transmitting antenna: and
    determine a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the at least one operating mode is further indicative of at least one of a mobile hotspot being activated and an E911 (Enhanced 9-1-1) callback mode being triggered, or any combination thereof.

13. The wireless communication apparatus of claim 11, wherein the processor is configured to determine the transmission power characteristic so that the at least one transmitting antenna does not exceed a specific absorption rate (SAR) threshold.

14. A wireless communication apparatus comprising:
    at least one transmitting antenna; and a processor configured to:

receive an indication of at least one operating mode indicative of a proximity and an orientation of a transmitting antenna: and determine a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the processor is further configured to determine the at least one operating mode based on a determined criteria, wherein the determined criteria includes a duration of time of the wireless communication apparatus operating in a previous operating mode.

15. The wireless communication apparatus of claim 11, wherein the processor is further configured to determine the power transmission characteristic based on at least one of a type of call and a temperature of the wireless communication apparatus.

16. A wireless communication apparatus comprising:
at least one transmitting antenna; and
a processor configured to: receive an indication of at least one operating mode indicative of a proximity and an orientation of a transmitting antenna: and
determine a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the processor is further configured to determine the power transmission characteristic based on at least one of a type of call and a temperature of the wireless communication apparatus, and wherein the type of call is a call to an emergency operator.

17. A wireless communication apparatus comprising:
at least one transmitting antenna; and a processor configured to:
receive an indication of at least one operating mode indicative of a proximity and an orientation of a transmitting antenna: and
determine a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the processor is further configured to determine the power transmission characteristic by:
mapping the at least one operating mode to a determined value; and
providing the determined value to a look-up table associated with the radio access technology type, the look-up table configured to provide the power transmission characteristic based on the determined value.

18. The wireless communication apparatus of claim 11, wherein the power transmission characteristic includes at least one of a power transmission limit and a maximum power level.

19. The wireless communication apparatus of claim 11, wherein the radio access technology type corresponds to at least one of a wireless wide area network, a wireless local area network, a wireless network for sending voice communications, a wireless network for sending data communications, or any combination thereof.

20. A wireless communication apparatus comprising: at least one transmitting antenna; and a processor configured to:
receive an indication of at least one operating mode indicative of a proximity and an orientation of a transmitting antenna:

determine a power transmission characteristic based on the at least one operating mode and at least one of a radio access technology type, a band-class, a transmission configuration, an uplink channel, a traffic state, and a radio access technology transmission state used by the wireless communication apparatus, or any combination thereof; and adjust at least one power transmission level based on the determined power transmission characteristic, wherein the at least one power transmission level is adjusted based on a determination that the determined transmission power characteristic is different than a power characteristic previously used.

21. A wireless communication apparatus comprising:
means for receiving an indication of at least one operating mode indicative of a proximity and an orientation of at least one transmitting antenna of the wireless communication apparatus; and
means for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the means for determining the power transmission characteristic comprises means for determining a minimum between a maximum power transmission characteristic supported by the radio access technology type and a second power transmission characteristic determined by the at least one operating mode.

22. A wireless communication apparatus comprising:
means for receiving an indication of at least one operating mode indicative of a proximity and an orientation of at least one transmitting antenna of the wireless communication apparatus; and
means for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the at least one operating mode is further indicative of at least one of a mobile hotspot being activated and an E911 (Enhanced 9-1-1) callback mode being triggered, or any combination thereof.

23. The wireless communication apparatus of claim 21, wherein the transmission power characteristic is determined so that the at least one transmitting antenna does not exceed a specific absorption rate (SAR) threshold.

24. A wireless communication apparatus comprising:
means for receiving an indication of at least one operating mode indicative of a proximity and an orientation of at least one transmitting antenna of the wireless communication apparatus; and
means for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, further comprising means for determining the at least one operating mode of the wireless communication apparatus based on a determined criteria, wherein the determined criteria includes a duration of time of the wireless communication apparatus operating in a previous operating mode.

25. The wireless communication apparatus of claim 21, wherein the means for determining a power transmission characteristic comprises means for determining the power transmission characteristic based on at least one of a type of call and a temperature of the wireless communication apparatus.

26. A wireless communication apparatus comprising:
means for receiving an indication of at least one operating mode indicative of a proximity and an orientation of at least one transmitting antenna of the wireless communication apparatus; and
means for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the means for determining a power transmission characteristic comprises means for determining the power transmission characteristic based on at least one of a type of call and a temperature of the wireless communication apparatus, and wherein the type of call is a call to an emergency operator.

27. A wireless communication apparatus comprising:
means for receiving an indication of at least one operating mode indicative of a proximity and an orientation of at least one transmitting antenna of the wireless communication apparatus; and
means for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the means for determining a power transmission characteristic comprises:
means for mapping the at least one operating mode to a determined value; and
means for providing the determined value to a look-up table associated with the radio access technology type, the look-up table configured to provide the power transmission characteristic based on the determined value.

28. The wireless communication apparatus of claim 21, wherein the power transmission characteristic includes at least one of a power transmission limit and a maximum power level.

29. The wireless communication apparatus of claim 21, wherein the radio access technology type corresponds to at least one of a wireless wide area network, a wireless local area network, a wireless network for sending voice communications, a wireless network for sending data communications, or any combination thereof.

30. A wireless communication apparatus comprising:
means for receiving an indication of at least one operating mode indicative of a proximity and an orientation of at least one transmitting antenna of the wireless communication apparatus;
means for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof; and
means for adjusting at least one power transmission level based on the determined power transmission characteristic, wherein the at least one power transmission level is adjusted based on a determination that the determined transmission power characteristic is different than a power characteristic previously used.

31. A computer program product, comprising: a non-transitory computer-readable medium comprising:
code for receiving an indication of at least one operating mode indicative of a proximity and an orientation of at least one transmitting antenna of a wireless communication apparatus; and
code for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the code for determining the power transmission characteristic includes code for determining a minimum between a maximum power transmission characteristic supported by the radio access technology type and a second power transmission characteristic determined by the at least one operating mode.

32. A computer program product, comprising:
a non-transitory computer-readable medium comprising:
code for receiving an indication of at least one operating mode indicative of a proximity and an orientation of at least one transmitting antenna of a wireless communication apparatus: and
code for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the at least one operating mode is further indicative of at least one of a mobile hotspot being activated and an E911 (Enhanced 9-1-1) callback mode being triggered, or any combination thereof.

33. The computer program product of claim 31, wherein the transmission power characteristic is determined so that the at least one transmitting antenna does not exceed a specific absorption rate (SAR) threshold.

34. A computer program product, comprising:
a non-transitory computer-readable medium comprising:
code for receiving an indication of at least one operating mode indicative of a proximity and an orientation of at least one transmitting antenna of a wireless communication apparatus: and
code for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, further comprising code for determining the at least one operating mode of the wireless communication apparatus based on a determined criteria, wherein the determined criteria includes a duration of time of the wireless communication apparatus operating in a previous operating mode.

35. The computer program product of claim 31, wherein the code for determining a power transmission characteristic comprises code for determining the power transmission characteristic based on at least one of a type of call and a temperature of the wireless communication apparatus.

36. A computer program product, comprising: a non-transitory computer-readable medium comprising:
  code for receiving an indication of at least one operating mode indicative of a proximity and an orientation of at least one transmitting antenna of a wireless communication apparatus: and
  code for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the code for determining a power transmission characteristic comprises code for determining the power transmission characteristic based on at least one of a type of call and a temperature of the wireless communication apparatus, and wherein the type of call is a call to an emergency operator.

37. A computer program product, comprising: a non-transitory computer-readable medium comprising:
  code for receiving an indication of at least one operating mode indicative of a proximity and an orientation of at least one transmitting antenna of a wireless communication apparatus: and
  code for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof, wherein the code for determining a power transmission characteristic comprises:
    code for mapping the at least one operating mode to a determined value; and
    code for providing the determined value to a look-up table associated with the radio access technology type, the look-up table configured to provide the power transmission characteristic based on the determined value.

38. The computer program product of claim 31, wherein the power transmission characteristic includes at least one of a power transmission limit and a maximum power level.

39. The computer program product of claim 31, wherein the radio access technology type corresponds to at least one of a wireless wide area network, a wireless local area network, a wireless network for sending voice communications, a wireless network for sending data communications, or any combination thereof.

40. A computer program product, comprising:
  a non-transitory computer-readable medium comprising:
  code for receiving an indication of at least one operating mode indicative of a proximity and an orientation of at least one transmitting antenna of a wireless communication apparatus:
  code for determining a power transmission characteristic based on the at least one operating mode and at least one of a radio access technology type, a band-class, a transmission configuration, an uplink channel, a traffic state, and a radio access technology transmission state used by the wireless communication apparatus, or any combination thereof; and
  code for adjusting at least one power transmission level based on the determined power transmission characteristic, wherein the at least one power transmission level is adjusted based on a determination that the determined transmission power characteristic is different than a power characteristic previously used.

* * * * *